Figure 16:
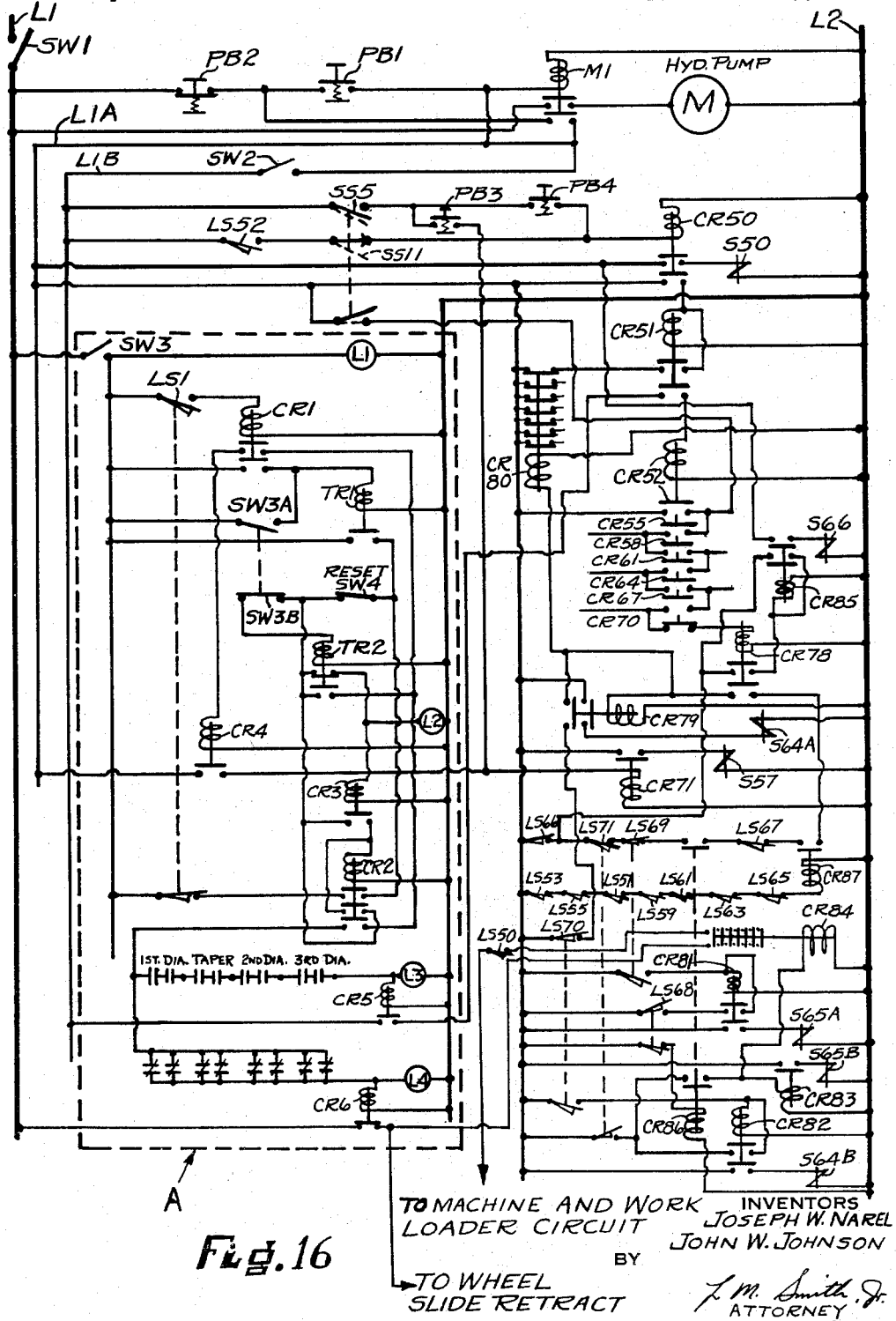

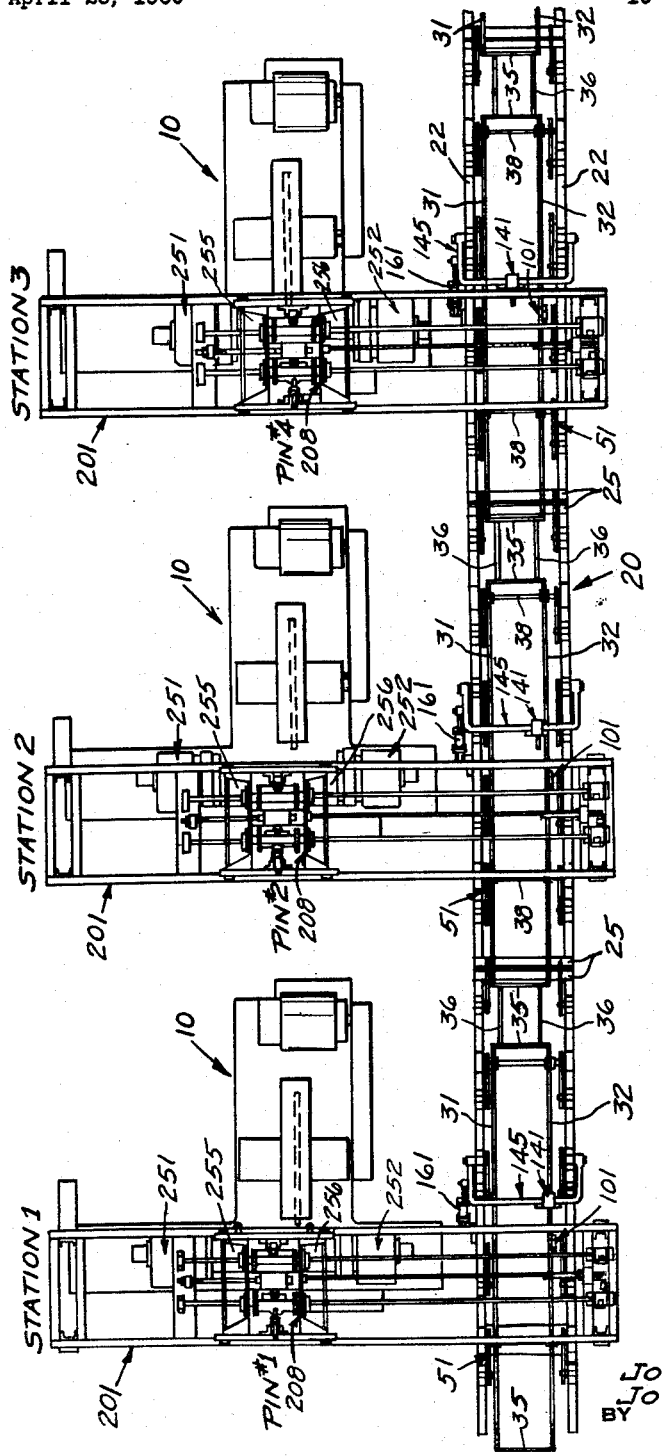

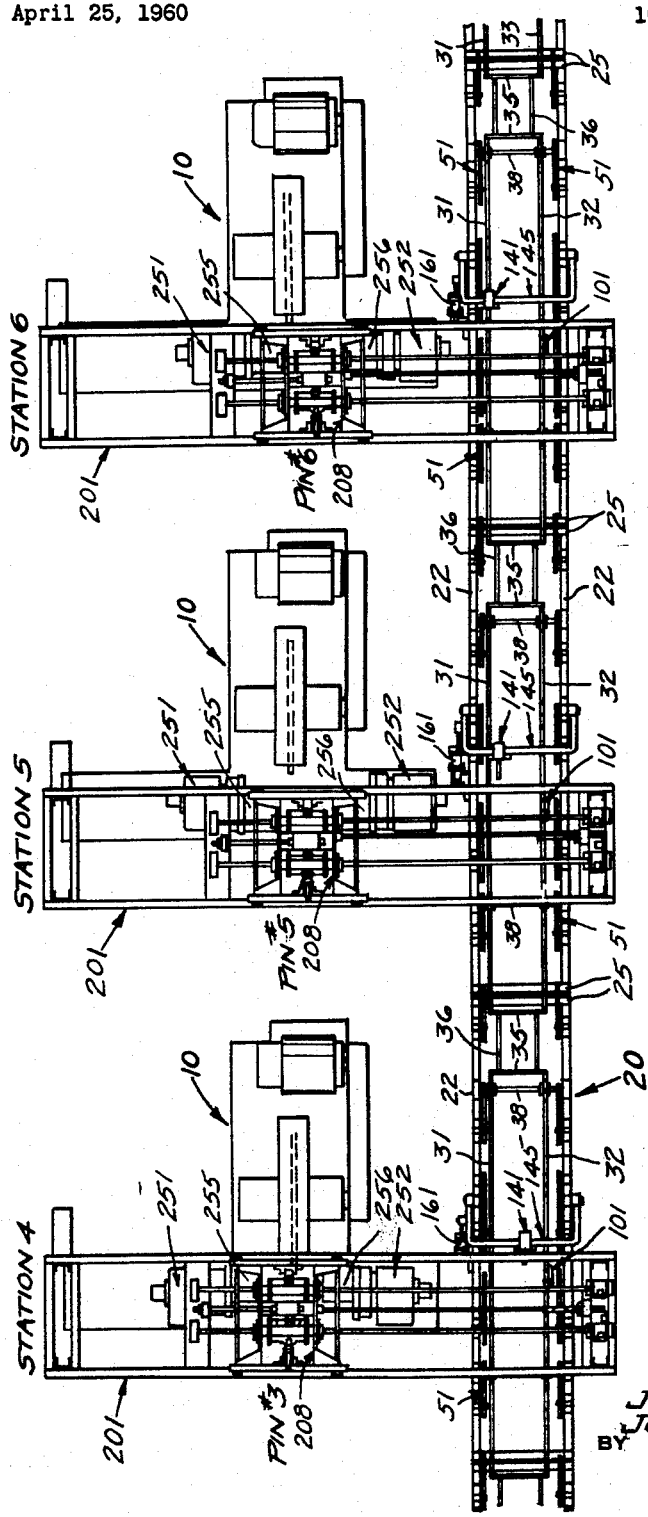

Dec. 10, 1963  J. W. NAREL ETAL  3,113,404
MACHINE TOOL LOADING AND TRANSFER MECHANISM
Filed April 25, 1960  10 Sheets-Sheet 3
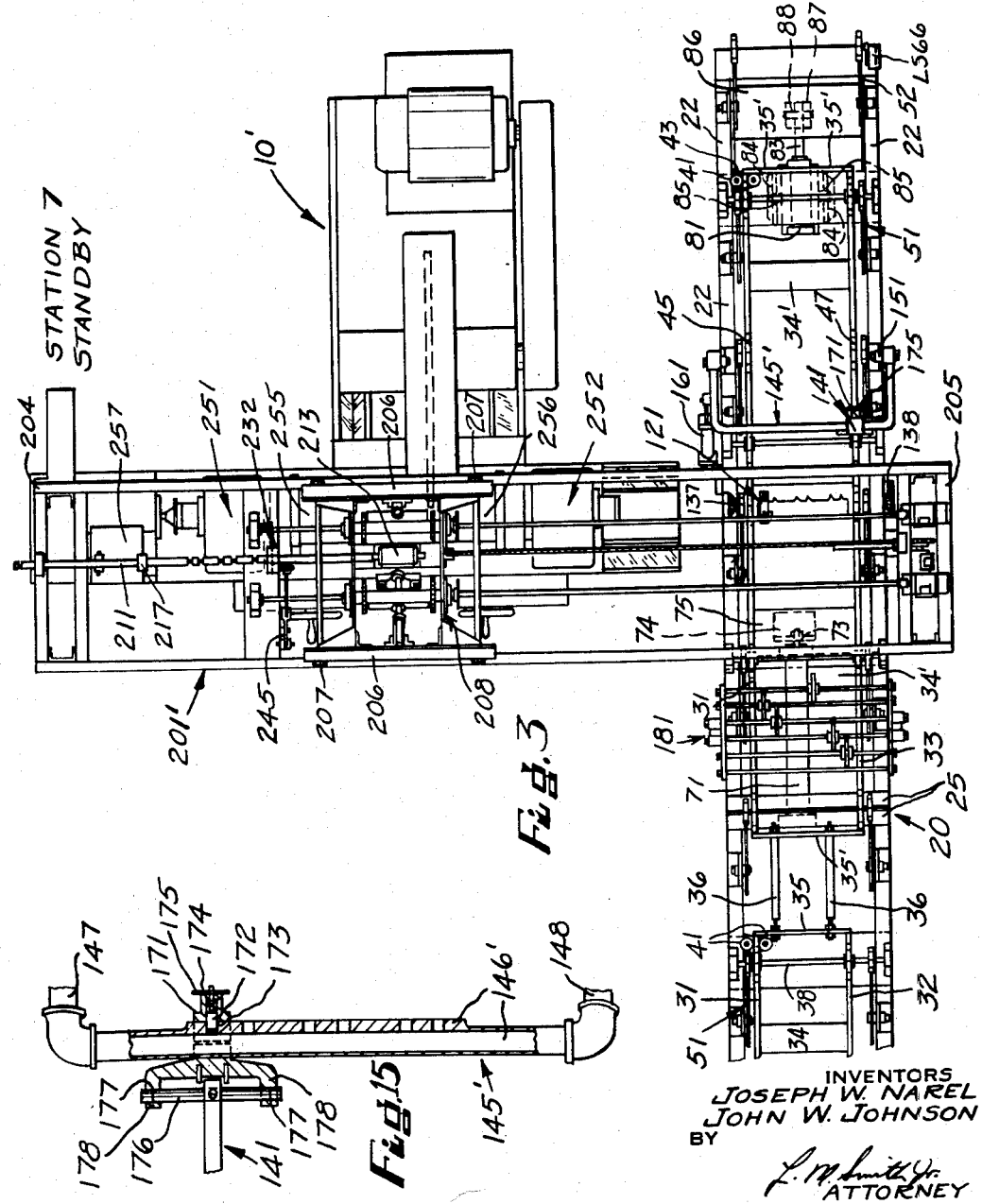
INVENTORS
JOSEPH W. NAREL
JOHN W. JOHNSON
BY
ATTORNEY

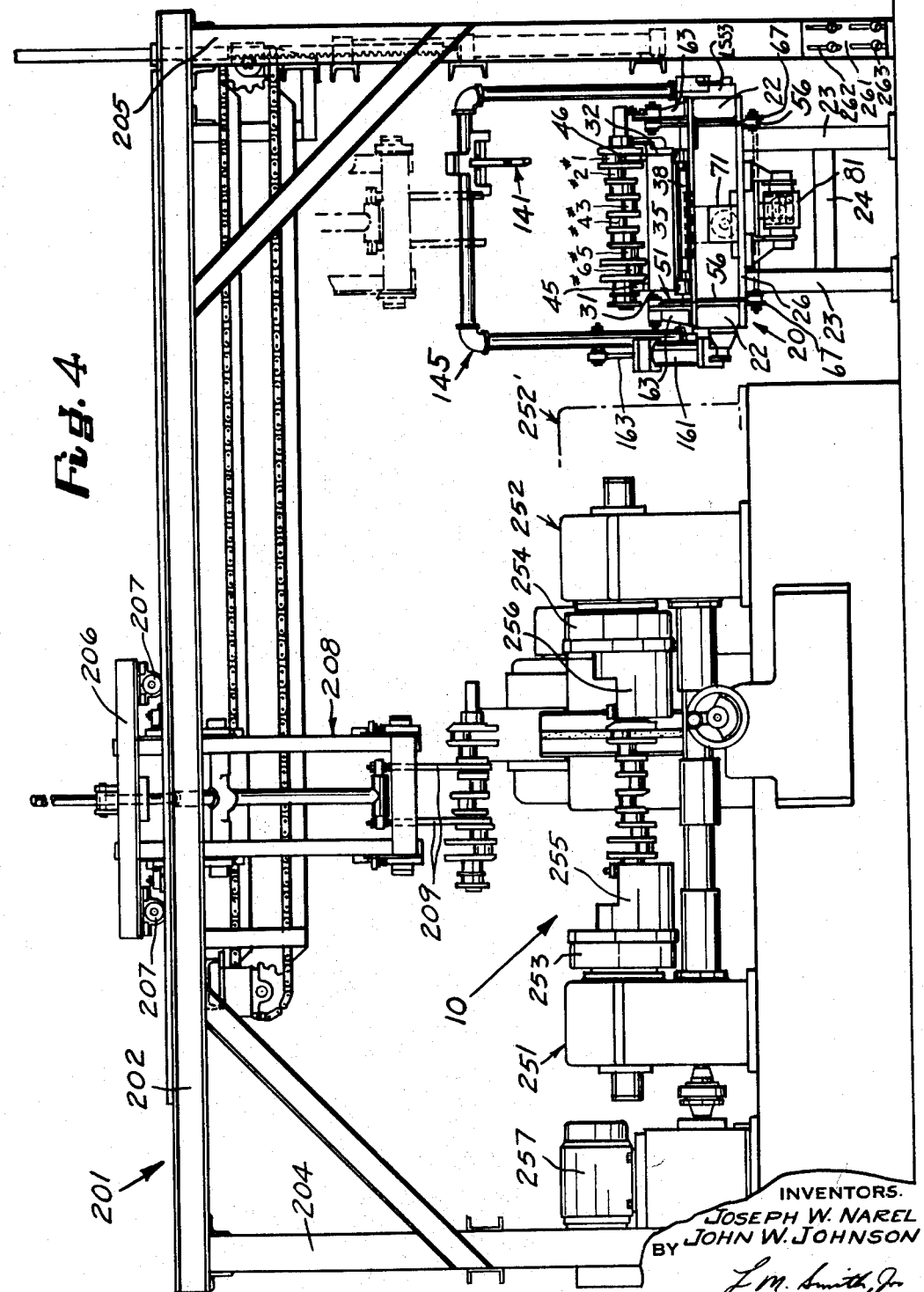

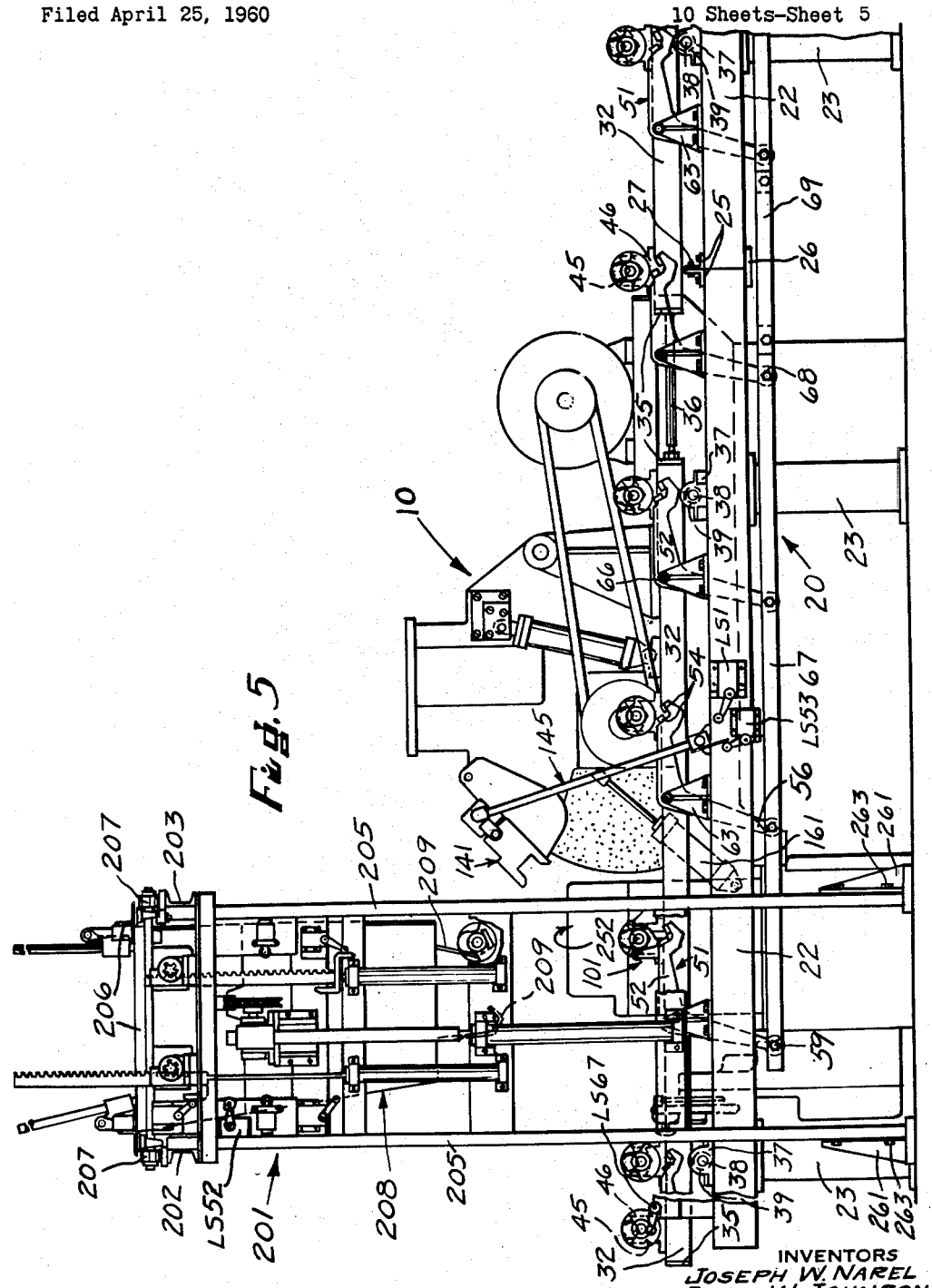

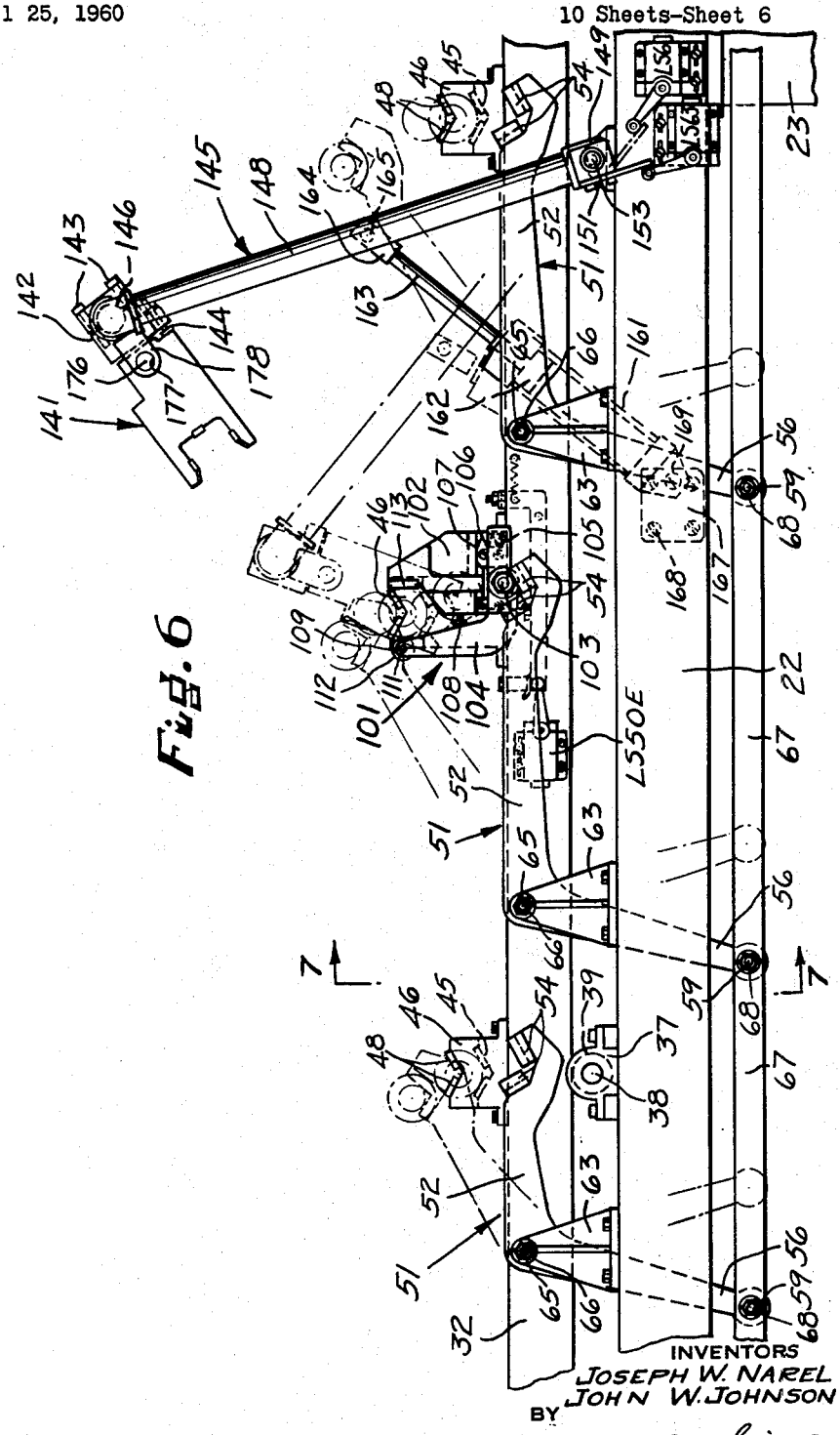

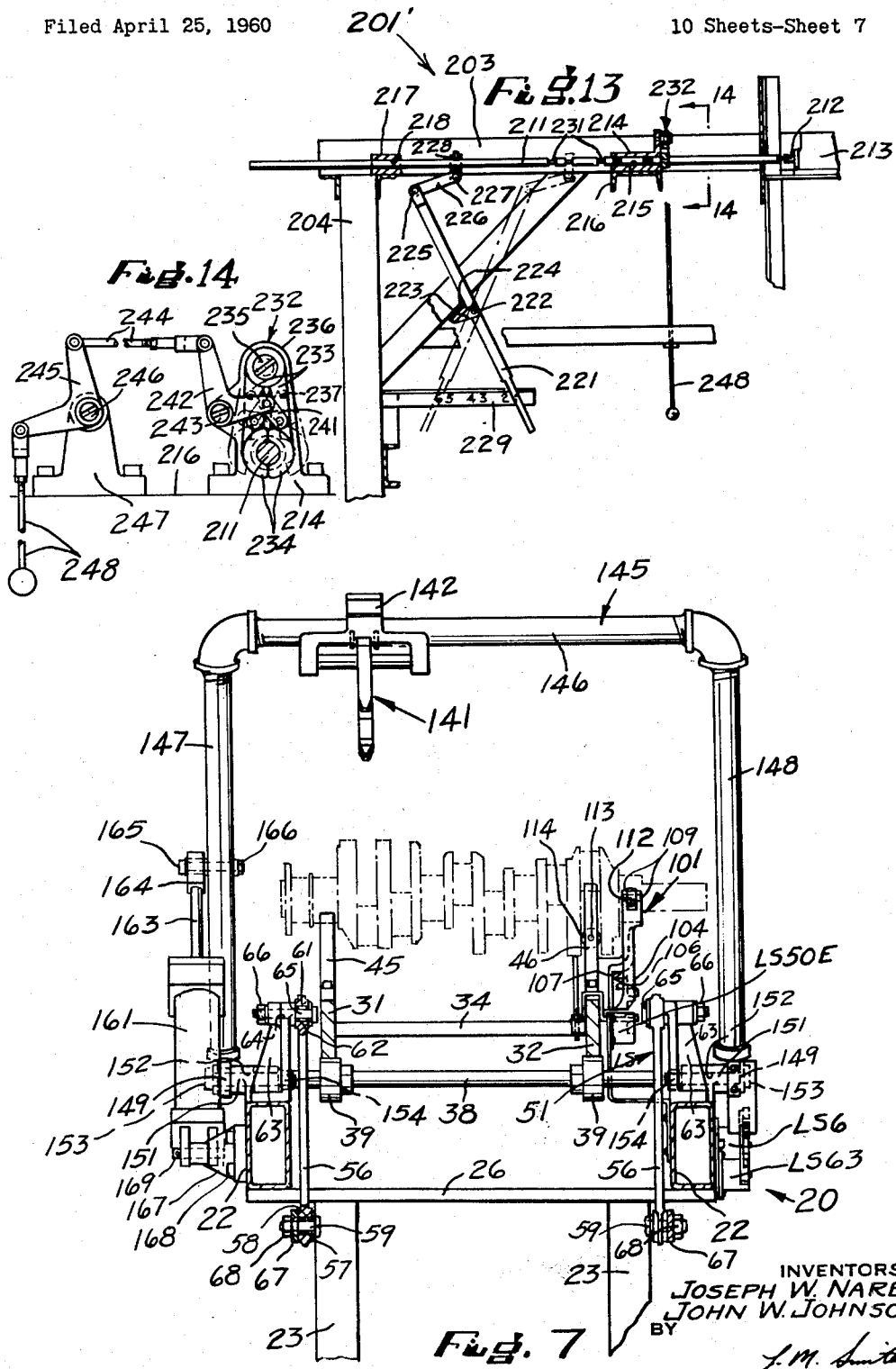

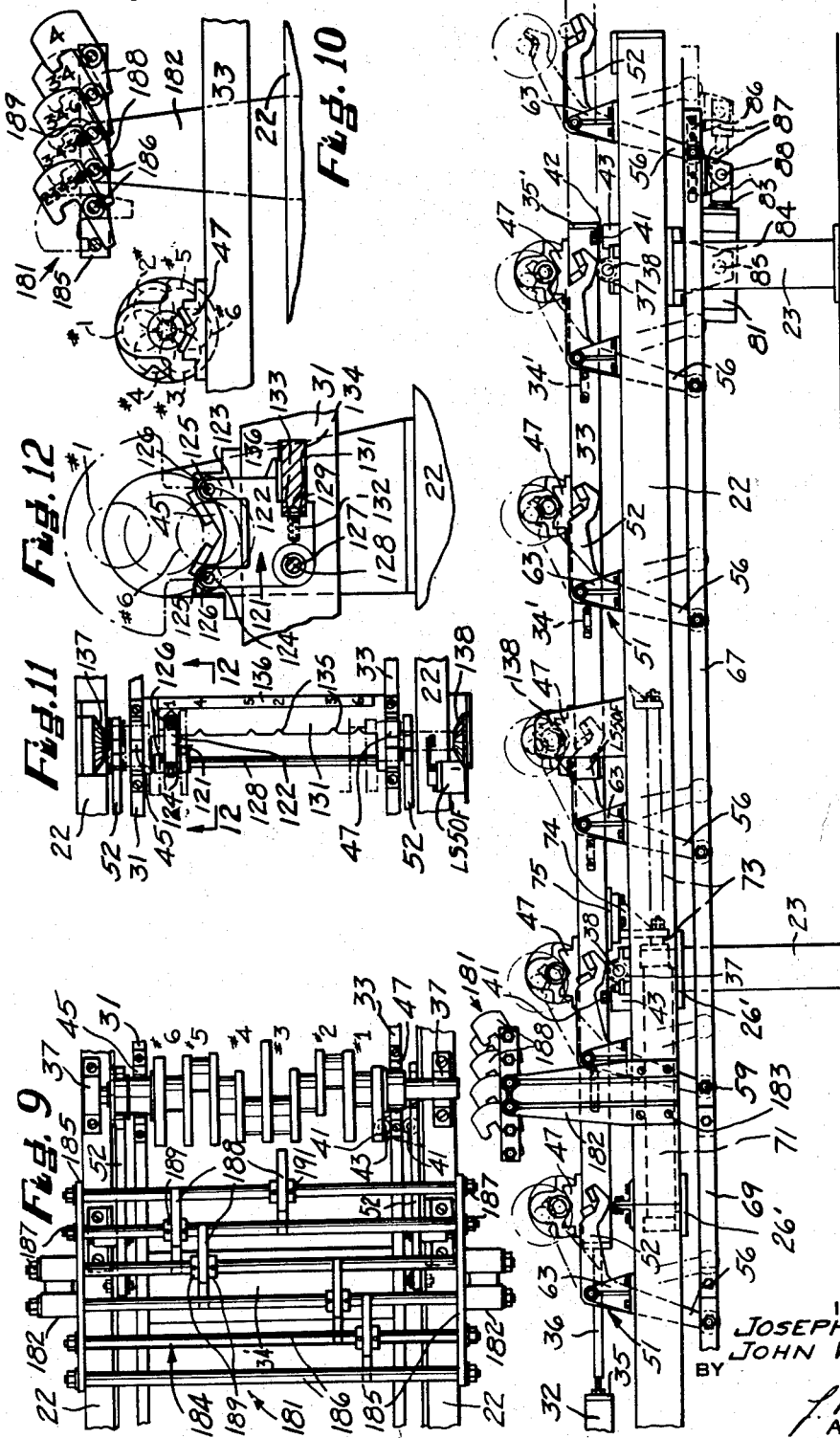

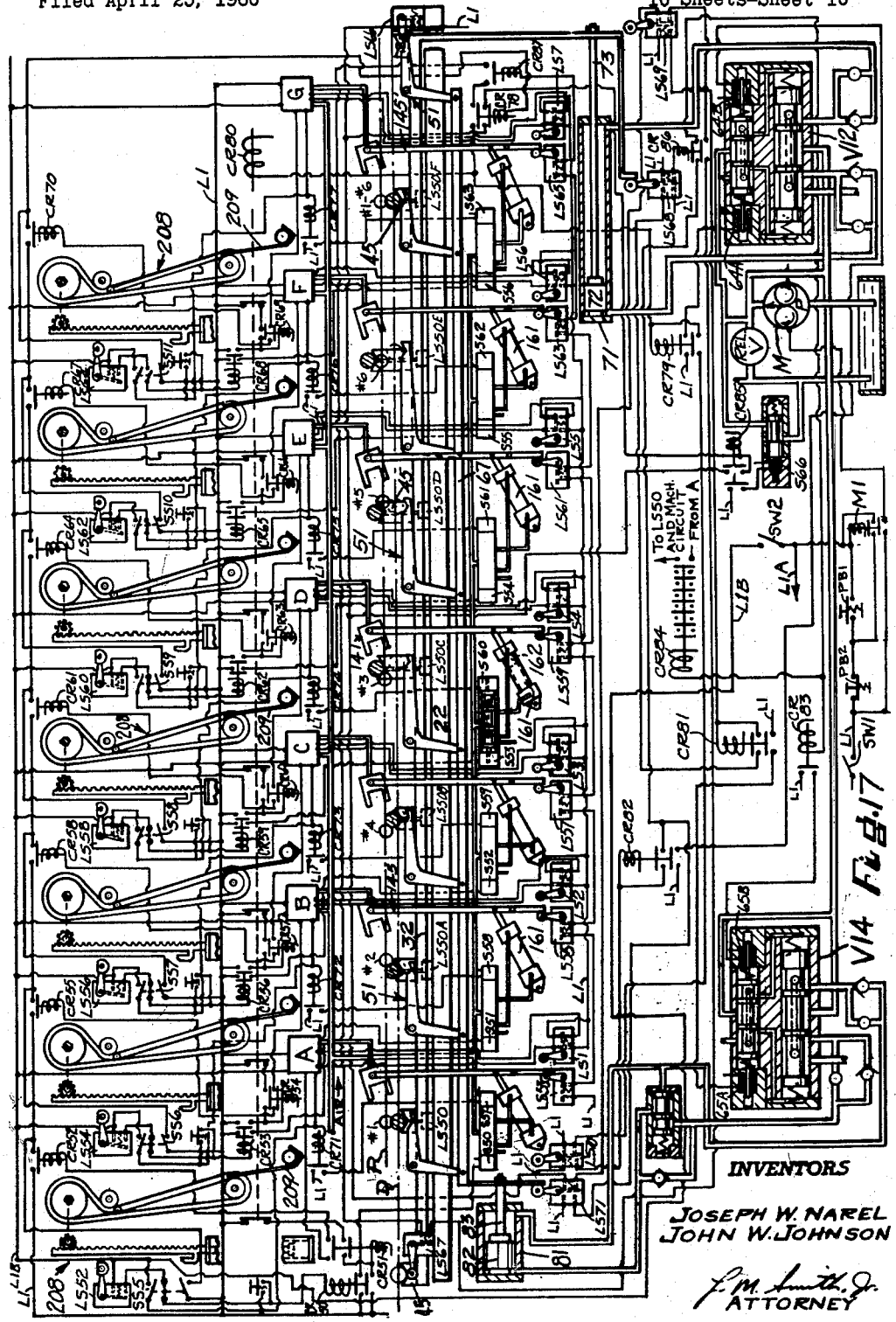

United States Patent Office 3,113,404
Patented Dec. 10, 1963

3,113,404
MACHINE TOOL LOADING AND TRANSFER MECHANISM
Joseph W. Narel, Worcester, and John W. Johnson, Holden, Mass., assignors to Norton Company, Worcester, Mass., a corporation of Massachusetts
Filed Apr. 25, 1960, Ser. No. 24,561
33 Claims. (Cl. 51—105)

This invention relates to a machine tool loading and transfer mechanism, and more particularly to an automatic machine tool loading and transfer mechanism including a unitized conveyor mechanism for supplying workpieces to and removing workpieces from a series of unitized machine tools respectively arranged to perform a series of discrete operations on each of a large number of standardized workpieces. In one suitable application, this invention is applied to a series of grinding machines for grinding the several crankpins on workpieces comprising engine crankshafts.

The present invention contemplates an arrangement of a substantial plurality of unitized machine tools disposed at a plurality of work stations served by automatically operable apparatus for coordinated delivery of a plurality of workpieces to the several work stations and coordinated removal of finished workpieces from the several work stations with a minimum interruption of the operating cycles of the several machine tools. This invention is further characterized by the inclusion of a substantial plurality of generally similar machine tools each arranged to perform a machining operation on a particular different portion of a workpiece, and by the inclusion of an additional universal machine tool capable of being adjusted to perform the function of the machine tool at any other station in the apparatus. Thus, the instant invention provides a method and an integrated means for producing substantial quantities of finished workpieces at a rapid rate by selectively by-passing a machine tool temporarily inoperative for any reason and diverting the workpieces to a universal machine at a standby station for the performance of the machining operation normally performed by the by-passed machine tool.

The general arrangement of the conveyor mechanism of the instant invention in relation to a plurality of unitized machine tools and the corresponding work loader mechanisms therefor generally resembles the arrangement illustrated in FIG. 1 of Narel Patent No. 2,813,381, issued November 19, 1957, reissued October 11, 1960 as Re. No. 24,884. However, the actual work loader mechanisms employed correspond closely to the work loading, transferring and discharging apparatus illustrated in FIG. 1 of Narel Patent No. 2,813,380, also issued November 19, 1957, reissued October 11, 1960 as Re. No. 24,885. At the same time the various portions of the apparatus comprising the instant invention have been substantially simplified in comparison to corresponding portions of the apparatus disclosed in the prior patents referred to above, the apparatus comprising the instant invention provides for increased flexibility of operation with enhanced performance characteristics by the inclusion of a standby station equipped with a universal machine tool capable of being adjusted to perform the machining operation of any one of the other stations. Specifically, in the illustrative embodiment of the instant invention wherein the machine tool located at each work station is a grinding machine of the general type illustrated best in FIG. 1 of Narel Patent Re. No. 24,885 replacing Patent No. 2,813,380, the machine tool at the standby station is a universal grinding machine with the work holder assemblies mounted on a movable table of the general type illustrated in Mader Patent No. 2,723,503, issued November 15, 1955.

One object of this invention is to provide a method and means for transferring a large quantity of workpieces selectively into and out of a coordinated series of machine tools such as grinding machines so that all of the requisite machining operations are completed upon each workpiece processed in accordance with the teachings of the instant invention.

Another object is the provision of apparatus arranged to continuously maintain a large number of workpieces in the required special orientation throughout such apparatus as these workpieces are moved into and out of a coordinated series of machine tool units such as grinding machines and to continuously coordinate the successive movements required for each of the respective workpieces being processed concurrently in the series of machine tool units serviced by this apparatus.

A further object is the provision of a universal type machine tool such as a grinding machine arranged in relation to a series of coordinated machine tools respectively arranged to perform a series of similar machining operations on various portions of successive workpieces so that said universal machine tool may be adjusted to perform the operation of any one of the series of coordinated machine tools with which it is associated.

Still another object is to provide means for detecting unsatisfactory operation by any one of a series of coordinated machine tools such as grinding machines and operable automatically to shut down the machine tool not performing satisfactorily.

Yet another object is the provision of control means for apparatus arranged to transfer a succession of workpieces into and out of a coordinated series of machine tools such as grinding machines, operable automatically to keep each machine tool continuously supplied with workpieces and to remove workpieces from each machine tool as the machining operation on each workpiece is completed by each machine tool, said control means being arranged to actuate the transfer apparatus controlled thereby concurrently with and in coordinated relation to the operation of the coordinated series of machine tools.

A final object is the provision of control means for apparatus arranged to supply workpieces to and remove workpieces from a series of coordinated machine tools, which control means is selectively operable to actuate the apparatus controlled thereby so that a selected machine tool is by-passed and workpieces are delivered instead to a universal machine tool adjusted to perform the operation normally performed by the machine tool which is by-passed.

Other objects and advantages of the instant invention will become fully apparent upon consideration of the following description, along with the showing in the enclosed drawings wherein:

FIGS. 1 and 2 together comprise a plan view of six similar grinding machines so arranged as to be served by a preferred embodiment of the apparatus characterizing the instant invention, FIG. 3 is a plan view of a universal grinding machine shown in operative relation to the preferred embodiment of the apparatus characterizing the instant invention so that it may be associated as a standby machine with the arrangement of six grinding machines illustrated in FIGS. 1 and 2, FIG. 4 is an end view of the preferred embodiment of the instant invention showing station 1 as viewed from the left hand side of FIG. 1, FIG. 5 is a side elevation, partially broken away, of the preferred embodiment of the instant invention showing station 1 as viewed from the bottom of FIG. 1, FIG. 6 is a side elevation, partially broken away, showing a portion of the preferred embodiment of the conveyor mechanism of the instant invention, including a showing of structural details of a workpiece pickup station on the conveyor mechanism and two adjoining workpiece stations, and also showing a gaging assembly in operative relation to the pickup station.

FIG. 7 is a vertical section through the conveyor mechanism taken on line 7—7 of FIG. 6, FIG. 8 is a side elevation of the portion of the conveyor mechanism shown in FIG. 3 in which a showing of the work loader mechanism and the grinding machine served thereby has been omitted in order to simplify the showing and clarify structural details of the conveyor mechanism, FIG. 9 is a plan view, partially broken away, of the portion of the conveyor mechanism illustrated in FIG. 8 showing additional details of the means for mounting a plurality of adjustable indexing elements for selectively determining the angular position of workpieces as they travel along this portion of the conveyor.

FIG. 10 is a schematized representation corresponding to a side elevation, partially broken away substantially on line 10—10 of FIG. 9, providing an additional showing of the adjustable indexing elements for angularly positioning the workpieces, illustrated in FIG. 8 and in FIG. 9, FIG. 11 is a plan view, partially broken away, showing a portion of the conveyor mechanism which includes an adjustable precision positioning means for the workpieces located at the work pickup station for the adjustable universal grinding machine at station 7, FIG. 12 is a side elevation, partially broken away substantially on line 12—12 of FIG. 11, of the device shown in FIG. 11, FIG. 13 is a side elevation, partially broken away, of the work loader mechanism for station 7, including a showing of the mechanism for positioning adjustable stops at a transverse location corresponding to the crankpin to be ground at station 7, FIG. 14 is a vertical cross section taken on line 14—14 of FIG. 13, FIG. 15 is a plan view, partially broken away and sectioned, showing an adjustably positioned means for selectively securing a gage support at a position corresponding to the crankpin to be ground on station 7, FIG. 16 is a simplified schematic representation of a representative portion of the electrical circuit comprising the control system for the apparatus characteristic of the instant invention, and FIG. 17 is a simplified representation of the electrical circuit and the hydraulic and pneumatic systems for controlling coordinated operation of a plurality of machine tools such as grinding machines and the apparatus for supplying workpieces to and removing workpieces from such a series of coordinated machine tools.

Conveyor Mechanism Assembly

Referring now to the drawings wherein like reference numerals are used to refer to like or corresponding parts illustrated in the several views, FIGS. 1 and 2 together comprise a plan view of the preferred embodiment of the instant invention showing a series of six generally similar machine tools such as grinding machines 10 located at a series of work stations identified as stations 1 through 6, and cooperating apparatus for selectively delivering a succession of similar workpieces to and removing workpieces from the respective grinding machines 10 at the several stations.

FIG. 3, as drawn to a slightly larger scale, illustrates a plan view of an extension of the right hand end of the apparatus as viewed in FIG. 2 comprising a universal machine tool such as a universal grinding machine 10' and apparatus for delivering a succession of similar workpieces to and removing these workpieces from the grinding machine 10' located at the standby station 7.

The showing in FIGS. 1, 2, and 3 of the conveyor mechanism assembly 20 is supplemented by the more detailed illustration of various features of this assembly in FIGS. 4 through 9. Considering first the showings in FIGS. 4 and 5, it will be noted that the conveyor mechanism assembly 20 includes a base portion or supporting means comprising a pair of elongated side frames 22 parallelly disposed in a horizontal plane and supported upon a series of pairs of upright legs 23 interconnected by horizontal cross members 24. While each of the elongated side frames 22 might be fabricated from a single piece of material, they are preferably composed of a series of shorter sections secured and suitably spaced by end angle frames 25 and by a plurality of transverse frame members 26, the end angle frames 25 serving also to receive connecting bolts 27 to interconnect successive sections of the side frames 22 in endwise alignment as illustrated particularly in FIG. 5 to form a unitary base portion.

Reciprocating Portion

The reciprocating portion of the conveyor mechanism assembly 20 supported by the base portion described above, includes a pair of side rails extending along substantially the entire length of the base portion of the conveyor mechanism in longitudinal sliding relation thereto. The respective side rails disposed in spaced parallel relationship in a horizontal plane slightly above that of the elongated side frames are likewise preferably composed of a succession of relatively shorter sections suitably interconnected in endwise alignment not only to facilitate fabrication of this assembly, but also because various sections of the side rails must be spaced differently. The six sections of the side rails adjoining stations 1 through 6 include side rails 31 and side rails 32 secured in the proper spaced relation by cross members 34 and end plates 35 while the section of the side rails adjoining the standby station 7 includes a side rail 31 and a side rail 33 spaced apart a slightly greater distance and secured by cross members 34' and end plates 35'. The respective sections of the side rails may conveniently be of a length corresponding to the length of successive sections of the elongated frames 22 and they may be interconnected in endwise alignment by suitable connecting means such as the pairs of tie rod assemblies 36 shown best in FIG. 3. The means for supporting the side rails in sliding relation to the base portion of the conveyor mechanism assembly includes a plurality of pairs of bearing assemblies 37 mounted at spaced intervals along the upper surfaces of the respective elongated side frames 22 so that they may rotatably support elongated transverse roller shafts 38 provided with relatively enlarged supporting rollers 39 formed integrally therewith or attached thereto for engagement with the undersides of the respective side rail sections supported thereby. The relative disposition of the elements comprising the supporting means for the side rail sections is best illustrated in FIG. 8 including a showing of the side rail section adjoining station 7 composed of side rail 31 and side rail 33. In addition to the support for the side rails provided by rollers 39, each side rail section is restrained against lateral displacement relative to the elongated side frames by at least two pairs of guide rolls 41 disposed in rolling engagement with the opposite side faces of side rails 32 or 33 and rotatably supported on vertically disposed pins 42 secured to guide roll supporting brackets 43 in turn attached to one of the elongated side frames 22 in the manner best illustrated in FIGS. 8 and 9.

The spaced pairs of side rails 31 and 32 or 31 and 33 are reciprocated relative to the elongated side frames 22 of the base portion of the conveyor assembly in order to advance a succession of workpieces through successive stations along the length of the conveyor assembly. For this purpose the respective side rails are fitted with workpiece supporting brackets 45 and 46 or 47 having V- shaped upper surfaces, attached to the respective side rails at predetermined spaced intervals. The respective V-shaped upper surfaces of each bracket are provided with workpiece engaging blocks 48 of suitable soft material such as bronze or the like.

The work piece engaging blocks 48 of the workpiece supporting brackets 45 fixedly secured to the side rail sections 31 are positioned to engage the main bearing adjacent one end of each of a succession of work pieces comprising engine crankshafts and the workpiece engaging blocks 48 of the workpiece supporting brackets 46 fixedly secured to the side rail sections 32 at corresponding spaced intervals are positioned to engage the #1 crankpin of successive workpieces comprising crankshafts. Since the #1 crankpin is offset from the axis of the main bearings of a crankshaft, the workpiece supporting brackets 46 are made longer by the amount of this offset than the workpiece supporting brackets 45. Thus, with this combination of supporting brackets, one of which engages each crankshaft above its center of gravity, the weight of each crankshaft restrains the respective crankshafts from angular rotation about their respective longitudinal axes as they are positioned successively on the respective supporting brackets mounted at predetermined intervals along the respective side rails.

In contrast to the arrangement of workpiece supporting brackets described above which is typical for the side rail sections adjoining stations 1 through 6, it should be noted that the side rail section adjoining station 7 is characterized by a wider spacing between side rail 31 and side rail 33 and further by the use of workpiece supporting brackets 47 corresponding to brackets 45, and hence substantially shorter than brackets 46, having V-shaped upper surfaces positioned to engage a main bearing at the opposite end of a workpiece comprising a crankshaft from the main bearing engaged by the bracket 45. With this configuration of the supporting brackets the successive crankshaft supported thereby are free to rotate about the longitudinal axis with which the several main bearings are concentric. This configuration of the workpiece supporting brackets is best illustrated in FIG. 8 and the necessity for this configuration of the supporting brackets adjoining station 7 will become apparent from the description below of the structure illustrated in FIGS. 8 and 9.

*Rotating Portion*

In order to advance a series of work pieces through successive stations along the length of the conveyor mechanism assembly described herein, it is necessary to lift the work pieces from the supporting brackets after the side rail sections have been advanced and while the side rail sections are being returned to their starting position. This function is performed by additional elements of the moving portion of the conveyor mechanism assembly 20 including spaced pairs of bell crank assemblies 51 disposed as illustrated in FIGS. 5, 6, 7 and 8. Each bell crank assembly 51 includes a first arm 52 initially disposed in a substantially horizontal position shown best in FIG. 6 and provided at the end thereof with workpiece receiving jaws 53 having a V-shaped upper surface fitted with a pair of workpiece engaging blocks 54 of suitable soft material such as bronze or the like. Each bell crank assembly also includes a second dependent arm 56 initially disposed in a substantially vertical position provided at the lower end with a bushing 57 disposed in a hole 58 to receive a threaded bolt 59.

Each bell crank assembly 51 is provided intermediate its opposite ends with a bearing 61 inserted in a hole 62 in a suitable boss so that each bell crank may be rotatably supported at the upper end of a bell crank supporting bracket 63 secured to one of the elongated frames 22 and provided at its upper end with a hole 64 to receive a pivot pin 65 with a head at one end and threaded on the other end so that the pivot pin 65 may be secured by a nut 66 after the bearing 61 in the bell crank assembly 51 has been fitted over the threaded end of the pivot pin 65. Referring particularly to the showing in FIG. 7, it will be noted that the respective bolts 59 are passed through the bushings 57 in holes 58 at the lower ends of the respective arms 56 of a pair of bell crank assemblies 51, and also that each bolt 59 also passes through a suitable hole in an elongated push-pull rod assembly 67 for threaded engagement with a nut 68 so that the lower ends of all of the bell crank assemblies 51 are pivotally interconnected with a pair of push-pull rod assemblies extending the length of the conveyor mechanism assembly 20 and disposed parallel to and beneath the respective elongated side frames 22, in the manner illustrated in FIGS. 5, 6 and 8. While each of the push-pull rod assemblies 67 might consist of a single piece, they may conveniently be composed of shorter sections rigidly interconnected in axial alignment by suitable link members 69 secured by suitable attachment means such as bolts, in the manner best illustrated in FIGS. 5 and 8.

From consideration of the showing in FIGS. 5, 6, and 8, it will be evident that the particular configuration for the rotating portion of the conveyor mechanism assembly described above requires very little additional space above the reciprocating portion of the conveyor mechanism assembly since the arms 52 of the bell crank assemblies 51 are initially disposed in horizontal positions alongside the reciprocating portion and since they need only be rotated through a relatively small acute angle about the pivot pins 65 alongside the reciprocating portion to engage and lift the work pieces out of engagement with the supporting brackets fixedly secured to the reciprocating portion. Similarly, from consideration of these same figures, it will be evident that the configuration of the rotating portion described above is such that the lowermost extremities of the dependent arms 56 extend only a limited substantially constant distance below the relatively flat reciprocating portion of the conveyor mechanism assembly.

*Considerations for Coordinating Reciprocating and Rotating Portions*

Recalling that the workpieces comprising crankshafts are never rotated about their longitudinal axes as they are successively transferred into and out of work stations 1 through 6, and that crankpins #1 through #6 are disposed in diverse angular relationships to the longitudinal axes of the crankshafts, it will be noted from consideration of the schematic showing in FIG. 17 that the crankshafts must be supported at various elevations relative to horizontal reference line D in FIG. 17 in order to position the respective crankpins 1 through 6 to be ground at the successive stations coincident with the crankpin horizontal reference line P in FIG. 17. Therefore, it is essential that the crankshaft supporting brackets at and adjoining the several work stations be of suitable different heights so as to support the crankshafts at the proper elevations for lateral transfer by means of suitable work loader mechanisms into proper working relationship with the various grinding machines located at the several work stations. Specifically, the workpiece supporting brackets at and adjoining work stations 2 and 3 are the same height and slightly taller than the workpiece supporting brackets at and adjoining station 1, the workpiece supporting brackets at stations 4 and 5 are slightly taller than those at and adjoining stations 2 and 3, and the workpiece supporting brackets at and adjoining station 6 are slightly taller than those at and adjoining stations 4 and 5. However, the difference in height between the respective brackets 45 and 46 in each pair of brackets is the same throughout all of the portions of the conveyer adjoining stations 1 through 6, since each pair of brackets must engage a main bearing and crankpin bearing #1 of each crankshaft to support each crankshaft with its longitudinal axis horizontal at each station.

In order to compensate for the various heights of the workpiece supporting brackets, the substantially horizontal arms 52 of the respective pairs of bell crank assemblies 51 are correspondingly varied in length with the bell crank assemblies having the shortest arms disposed to cooperate with the shortest workpiece supporting brackets. Specifically, the arms 52 of the bell crank assemblies at and adjoining stations 2 and 3 are slightly longer than arms 52 of the bell crank assemblies at and adjoining station 1, the arms 52 of the bell crank assemblies at and adjoining stations 4 and 5 are slightly longer than those of the bell crank assemblies at and adjoining stations 2 and 3, and the bell crank assemblies at and adjoining station 6 have arms 52 slightly longer than those of the bell cranks at and adjoining stations 4 and 5.

Noting that the portion of the conveyor mechanism assembly adjoining station 7, the standby station, incorporates workpiece supporting brackets arranged to permit rotation of crankshafts about their longitudinal axes to position the crankpin to be ground immediately above and in vertical alignment with the main bearings of a crankshaft, the workpiece supporting brackets at and adjoining station 7 are substantially the same height as the workpiece supporting brackets 45 at and adjoining station 1, the arms 52 of the bell crank assemblies at and adjoining station 7 are relatively short and substantially identical to those of the bell crank assemblies at and adjoining station 1.

In view of the fact that the workpieces are positioned at different heights at the various work stations and at the pick up stations on the conveyor corresponding thereto, the U-shaped gage heads supporting frame for each station must be properly sized and positioned so that the gage head 141 employed at each station is properly positioned for movement into and out of engagement with the crankpin ground at that station.

Where the workpiece supporting brackets must be of different heights as in the illustrative embodiment of the instant invention wherein the workpieces are crankshafts, these pairs of workpiece supporting brackets may not be mounted upon the respective side rails at uniform distances along these rails. In fact, in the preferred embodiment of the instant invention they are so spaced that the longitudinal axes of the respective workpieces would intersect the horizontal reference line D in FIG. 17 at suitable equally spaced intervals such as 30", for example, if they were swung past this reference line by the respective pairs of bell crank assemblies adjoining and cooperating with the respective pairs of workpiece supporting brackets. The respective pairs of brackets are so positioned in relation to the respective reference points that they support the respective workpieces not only at the desired height, but also at a point on the path generated by rotating the work engaging portions of the respective pairs of bell cranks, taking into account the fact that the radii of these paths vary with the length of the arms 52 of the respective pairs of bell crank assemblies.

Actuators for Conveyor Mechanism

The reciprocating portion of the conveyor mechanism assembly 20 including the side rail sections 31, 32 and 33 is moved back and forth in relation to the base portion of the conveyor assembly including side frames 22 by means of an hydraulically operated side rail actuating cylinder 71 illustrated in FIGS. 3 and 8 and schematically in FIG. 17 and including a piston 72 connected to one end of an elongated piston rod 73 secured at its outer end to a bracket 74 secured in turn to a bracket supporting plate 75 attached to and interconnecting spaced side rails 31 and 33. The side rail actuating cylinder 71 is secured in a longitudinal position substantially parallel to the side frames 22 by attachment to transverse frame members 26' interconnecting the respective side frames 22 as shown best in FIG. 8.

The concurrent angular displacement of the plurality of bell crank assemblies 51, first counter-clockwise and then clockwise as viewed in FIGS. 5, 6 and 8, which is coordinated by the pair of push-pull rod assemblies 67, is produced by an hydraulically operated bell crank actuating cylinder 81 shown best in FIGS. 3 and 8 and schematically in FIG. 17. The cylinder 81 encloses a piston 82 attached to one end of an elongated piston rod 83. The cylinder 81 is secured in fixed longitudinal relation to the side frames 22 by means of a pair of trunnion supporting brackets 84 encircling a pair of trunnions 85 projecting from the sides of cylinder 81 so that the cylinder 81 is free to rotate about a horizontally disposed transverse axis as the piston rod 83 moves in and out of the cylinder 81 in response to displacement of the piston 82. The respective push-pull rod assemblies 67 are interconnected at one end by a transversely extending push-pull rod assembly drive plate 86 supporting a pair of brackets 87 respectively provided with aligned holes to receive a pivot pin 88 passed through these holes and through a suitable hole in an end fitting secured to the outer end of piston rod 83. See particularly FIGS. 3 and 8.

Workpiece Positioning Means

The workpiece supporting brackets on the sections of the conveyor serving work stations 1 to 6 are respectively offset at each station on the conveyor so that each workpiece comprising a crankshaft is supported in a horizontal position by these brackets in a predetermined angular orientation generally maintained by the weight of the crankshaft itself in the manner described above. However, at the several stations on the conveyor where the workpieces are picked up by the hooks of the respective work loader mechanisms, this arrangement for general restraint of the angular orientation of the crankshafts is supplemented by a precise positioning mechanism 101 for the workpiece, shown best in FIGS. 6 and 7, described in detail below. While only one such mechanism is illustrated in detail, the showing of this mechanism in FIGS. 6 and 7 may be considered representative of such mechanisms at each of the pick-up stations on the conveyor mechanism for each of work stations 1 through 6. A substantially different precise positioning mechanism is required for a pick-up station serving the stand-by work station 7, and this precision positioning mechanism will be described in further detail below.

Each precise positioning mechanism 101 includes an upright bracket 102 secured in fixed relation to side rail 32 adjacent to the workpiece supporting bracket 46 at one of the conveyor pick-up stations for work stations 1 through 6. A pivotal supporting element 103 projecting from each upright bracket 102 rotatably supports a bent arm 104 provided at one end with a spring receiving recess 105 enclosing a biasing spring 106 positioned to bear against a shoulder 107 which may conveniently be formed integrally with the upright bracket 102 so that the bent arm 104 is continuously biased in a clockwise direction into engagement with an adjustable stop 108. The upper end of the bent arm 104 may conveniently be provided with a pair of spaced ears 109 with aligned holes therethrough to receive a supporting pin 111 upon which a clamping roller 112 is mounted for rotation between the spaced ears 109. The bent arm 104 is so positioned that clamping roller 112 engages one side of a main bearing when a crankshaft is deposited on the adjoining workpiece supporting brackets 45 and 46, and, under the influence of biasing spring 106, positions the opposite face of the same main bearing in engagement with a vertically disposed workpiece positioning block 113 of suitable relatively soft material such as bronze or the like fixedly secured to the upright bracket 102 and providing a fixed reference surface. Since the crank shaft main bearing engaged by the clamping roller 112 is radially offset on the crankshaft from crankpin bearing #1 supported by workpiece supporting bracket 46, the clamping roller 112 is effective to precisely position a crankshaft in the desired predetermined angular position.

The precise positioning mechanism 101 for the workpiece also includes an endwise locator comprising an endwise positioning roller 114 disposed in a suitable transverse slot through workpiece supporting bracket 46 and rotatably supported upon supporting pin 115 inserted in a suitable hole in workpiece supporting bracket 46. The endwise positioning roller 114 is of such a diameter as to be closely but freely interfitted between the respective cheeks of the crankshaft adjoining crankpin #1, as each crankshaft is deposited on the workpiece supporting brackets 45 and 46 at the respective pick-up stations on the conveyor mechanism. In this manner, each crankshaft is automatically accurately positioned axially as it is deposited at each station equipped with a precise positioning mechanism 101.

The pick-up station on the section of the conveyor mechanism serving work station 7 is equipped with a modified precise positioning mechanism 121, shown best in FIGS. 11 and 12, adjustable to receive workpieces comprising crankshafts in any one of six different predetermined angular orientations. This adjustable precise positioning mechanism 121 includes a vertically disposed generally U-shaped guide member 122 provided with a pair of upstanding arms 123 terminating at their upper ends in pairs of spaced ears 124 with aligned holes therethrough to recieve pivot pins 125 rotatably supporting crankpin guiding and restraining rollers 126 of such a size and so spaced that their opposed peripheral surfaces engage the opposite sides of a predetermined crankpin as a crankshaft is deposited upon the workpiece supporting brackets 45 and 47 located at the conveyor mechanism pick-up station serving work station 7. The U-shaped guide member 122 is provided with a suitable hole 127 therethrough for sliding engagement with a horizontally disposed transverse supporting rod 128 extending between and supported by the respective side rails 31 and 33. The U-shaped guide member 122 is restrained against rotation about transverse supporting rod 128 and maintained in the proper angular orientation for the desired engagement with a predetermined crankpin on each crankshaft deposited at this station by a recess 129 snugly interfitted with the opposed faces of a transverse guide bar 131 extending between and supported by the respective side rails 31 and 33. In order to maintain the crankpin guiding and restraining rollers 126 in the desired location longitudinally of the supporting rod 128, the U-shaped guide member 122 is provided with a spring receiving recess 132 at the bottom of recess 129 containing a biasing spring 133 acting against a ball detent 134 continuously biased into engagement with the adjacent edge of transverse guide bar 131 and with any one of a plurality of notches 135 in this edge of transverse guide bar 131. In order to facilitate positioning the U-shaped guide member 122 in the desired location longitudinally of the supporting rod 128, a suitable scale 136 is mounted on the upper face of the transverse guide bar 131.

Since the adjustable precise positioning mechanism 121, illustrated in FIG. 11, is arranged to operatively engage a downwardly depending crankpin, this mechanism positioned as shown in FIG. 11 to accurately angularly locate crankpin #1 actually engages the diametrically opposed crankpin #6. Thus, the U-shaped guide member 122 located adjacent #1 on scale 136 as illustrated in FIG. 11 is actually positioned transversely of the conveyor mechanism in alignment with crankpin #6. Similarly, when U-shaped guide member 122 is positioned adjacent #4 on scale 136, it is disposed in transverse alignment with crankpin #5 diametrically opposed to crankpin #4. Likewise, when U-shaped guide member 122 is used to accurately angularly position crankpin #5, it actually engages crankpin #4; when it is positioned to accurately angularly position crankpin #2 it actually engages crankpin #4; when it is positioned to accurately angularly position crankpin #3, it actually engages crankpin #2; and when it is positioned to accurately angularly position crankpin #6, it actually engages crankpin #1.

The precise positioning mechanism 121 also incorporates endwise locating means for the workpieces comprising a pair of opposed truncated conical camming surfaces 137 and 138 mounted in fixed relation to the respective elongated side frames 22 and positioned in axial alignment with and concentric of the longitudinal axis of a crankshaft supported by workpiece supporting brackets 45 and 47.

Workpiece Indexing Means

Since in the illustrative embodiment of the instant invention standby work station 7 includes a universal grinding machine 10′ to grind any one of six different crankpins, means must be provided for delivery workpieces comprising crankshafts to work station 7 in the proper angular orientation for the particular grinding operation to be performed at work station 7. This adjustment of the angular orientation of each crankshaft is accomplished by a crankshaft indexing mechanism 181, shown best in FIGS. 9 and 10 and also in FIGS. 3 and 8, mounted upon the conveyor mechanism assembly 20 beyond the pick-up station serving work station 6 and in front of the pick-up station serving work station 7. This crankshaft indexing mechanism 181 includes a pair of upright supporting members 182 fixedly secured at their lower ends to the respective elongated side frames 22 by suitable attachment means such as screws 183 and supporting a horizontally disposed generally planar transverse frame assembly 184 comprising a pair of end plates 185 interconnected by a series of six elongated spaced parallelly disposed supporting rods 186 threadably engaged at their opposite ends with nuts 187, and a series of five manually adjustable indexing finger elements 188 rotatably mounted upon five of the respective supporting rods 186 by means of a suitable hole through each finger element. Each finger element 188 is fixedly positioned longitudinally of the supporting rod 186 on which it is rotatably mounted by a pair of collars 189 fixedly secured to each supporting rod 186 on opposite sides of each finger element 188 by suitable attachment means such as set screws 191 shown best in FIG. 9. The respective indexing finger elements 188 may conveniently be so shaped that their rotation between an operable position and an inoperable position is limited by engagement at the respective extreme positions with one of the adjoining supporting rods 186 as best illustrated in FIG. 10. For convenience in adjusting the respective indexing finger elements 188, each finger element may be marked with one or more numbers corresponding with the respective crankpins on a crankshaft so that each crankshaft passed beneath the crankshaft indexing mechanism 181 will be properly angularly oriented automatically by placing all of the finger elements 188 bearing the number of the crankpin to be ground in the upright operative position illustrated in dotted lines in FIG. 10. On the other hand, when the crankshafts are ground completely on stations 1 through 6 and the standby station 7 is to be by-passed, all of the finger elements 188 may be placed in the inoperative position shown in solid lines in FIG. 10. Likewise, if crankpin #1 is to be ground at work station 7, all of the five finger elements 188 must be placed in the inoperative position shown in solid lines in FIG. 10, because the crankshafts leave the pick-up station for work station 6 in the correct angular orientation for grinding crankpin #1 at work station 7, with crankpin #1 disposed vertically above the main bearings of the crankshaft, as shown schematically in FIG. 10.

Referring particular to FIG. 10, crankpin #4 can be rotated into the proper position for grinding at work station 7 by rotating all of the indexing finger elements 188 counter-clockwise into an operable position corresponding to the dot-dash representation in FIG. 10. With such an arrangement, as a workpiece comprising a crankshaft, as illustrated, is passed from left to right beneath the crankshaft indexing mechanism 181 by operation of the conveyor mechanism assembly 20, the first finger element 188, positioned transversely of the conveyor mechanism as illustrated in FIG. 9, engages and restrains crankpin #1 so that the crankshaft is rotated counter-clockwise in the work piece supporting brackets 45 and 47 until the crankpin #2 occupies the uppermost position formerly occupied by crankpin #1. Thereafter the second finger element 188, positioned transversely of the conveyor mechanism as shown in FIG. 9, engages and restrains crankpin #2 so that crankpin #5 adjoining crankpin #2 is next rotated into the uppermost position occupied by crankpin #1 in FIG. 10. Continuing the sequential indexing operations, the third, fourth and fifth finger elements, respectively positioned transversely of the conveyor mechanism as illustrated in FIG. 9, successively engage crankpins #5, #6 and #3 to successively rotate crankpins #6, #3 and #4 into the uppermost position occupied by crankpin #1 in FIG. 10. This result is achieved by so proportioning the lower end of the first indexing finger element 188 so that the crankpin #1 passes beneath it when crankpin #2 has been rotated into the uppermost position formerly occupied by crankpin #1, and by similarly proportioning the lower ends of each of the successive indexing finger elements so that each crankpin engaged thereby passes beneath and therefore is no longer restrained thereby when the next adjacent crankpin reading clockwise in the showing of FIG. 10 has been rotated into the position occupied by crankpin #1 in FIG. 10.

Similarly, crankpin #3 is placed in the uppermost position for grinding at work station #7 by placing the first four indexing finger elements 188 in an operable position; crankpin #6 is placed in the uppermost position for grinding at work station #7 by placing the first three indexing finger elements 188 in an operable position; crankpin #5 is placed in the uppermost grinding position by placing the first two indexing finger elements 188 in an operable position; and crankpin #2 is placed in the uppermost grinding position by placing only the first indexing finger element 188 in an operable position.

*Post Process Gaging Apparatus*

The conveyor mechanism assembly 20 also includes means for initiating the cyclic operation of the conveyor mechanism upon the establishment of a satisfactory condition at each of the several workpiece pick-up stations on the conveyor mechanism. This means for initiating operation of the conveyor mechanism includes a series of post process gaging assemblies adjoining the seven stations and generally designated in FIG. 17 as gage assemblies A, B, C, D, E, F, and G. Since these gage assemblies are commercially available and may comprise units such as gage circuits incorporating the "Airlectric" gage heads produced by the Sheffield Corporation of Dayton, Ohio, the details of these gaging assemblies are no part of the instant invention. Accordingly, these assemblies are not illustrated in detail in the circuits included in FIG. 17. However, in order to facilitate an understanding of the manner in which these gaging means cooperate with other elements included in the control circuit of the instant invention, FIG. 16 provides a schematic diagram showing the interrelationship between the elements of the electrical circuit of a representative gage assembly A and the elements of the control circuit of the instant invention connected in operative relationship thereto.

The gage means adjoining each station includes a gage head 141 secured by a mounting clamp 142 and attachment bolts 143 to a U-shaped gage head supporting frame, generally designated by the reference numeral 145, including a horizontally disposed transverse member 146 attached by suitable connecting means at its opposite ends to one end of radial side member 147 and to one end of radial side member 148, each of which is provided at the other end with a suitable end fitting 149. The gage head supporting frame 145 is supported for rotation about a horizontal axis extending transversely of the conveyor mechanism by a pair of bearing assemblies 151 secured to the upper faces of the respective side frames 22 and provided with axially aligned holes 152 therethrough arranged to received headed and threaded pivot pins 153, passed through suitable holes in the end fittings 149, thence through the holes 152 in the bearing assemblies 151, and threadably engaged with nuts 154. The angular displacement of each gage head supporting frame 145 is controlled by an actuating cylinder 161 enclosing a piston 162 connected to one end of a piston rod 163 provided at its other end with an end fitting 164 with an aperture therethrough to receive a headed and threaded pivot pin 165 passed through a suitable transverse hole intermediate the ends of the radial side member 147 and secured by a nut 166. The aperture through the end fitting 164 is desirably elongated in the direction of piston rod 163 and the gage head supporting frame 145 and the cooperating actuating cylinder 161 are desirably so positioned that the gage head 141 moves into engagement with the crankpin to be gaged just before piston 162 bottoms in actuating cylinder 161. With this aperture sufficiently elongated the piston 162 may thereafter complete its stroke without applying a resultant force on the pivot pin 165 through piston rod 163 and end fitting 164. Due to the lost motion provided by the elongation of the aperture through the end fitting 164, the gage head 141 is always positioned in engagement with the successive crankpins to be gaged by the constant weight of the gage head supporting frame 145, and the force exerted on piston rod 163 which may vary in succeeding cycles due to various uncertain factors has no effect whatever upon the force with which the gage head 141 engages the crankpin.

The lower end of actuating cylinder 161 is pivotally connected to one of the elongated side rails 22 by means of a cylinder supporting bracket 167, secured by attachment means such as bolts 168 and supporting a headed pivot pin 169 projecting therefrom and through a suitable opening in the end of actuating cylinder 161. The cylinders 161 may conveniently be pneumatically operated, since a supply of pressurized air is required for operation of the gages.

The actuating cylinder 161 and the U-shaped gage head supporting frame 145 best illustrated in FIGS. 6 and 7 are typical of the arrangement found at each of the pick-up stations serving work stations 1 through 6. The showing in FIGS. 6 and 7 also generally resembles the arrangement of the U-shaped gage head supporting frame 145' adjoining work station 7 and the actuating cylinder 161 therefore, with the exception that the gage head mounting clamp 142 and the attachment bolts 143 are replaced by gage head supporting bracket 171 slidably and non-rotatably engaging a modified transverse member 146' having a longitudinal boss projecting therefrom provided with a series of apertures therethrough as shown best in FIG. 15. The supporting bracket 171 is arranged to be selectively positioned longitudinally of the transverse member 146' and to be maintained in the proper location by a lock pin 172 mounted slidably within a suitable recess 173 within the supporting bracket 171. The lock pin 172 is biased into inter-fitting engagement with one of the apertures through the longitudinal boss on transverse member 146' by a spring 174 also enclosed in the recess 173. The handle 175 connected to the outer end of the lock pin 172 limits the travel of the lock pin under the influence of spring 174 and permits manual withdrawal of the lock pin 172 from engagement with transverse member 146' when it becomes necessary to reposition the gage head supporting bracket 171 so that the gage head 141 is aligned with a different crankpin.

The precise positioning of the respective gage heads 141 longitudinally of the transverse members 146 adjoining work stations 1 through 6 and transverse member 146' adjoining work station 7 has been described above. In addition, precise angular adjustment of the gage heads 141 relative to the respective transverse members for accurate alignment with the respective ground crankpins to be gaged is accomplished by connecting the respective gage heads 141 to the respective gage head mounting clamps 142 and to the gage head supporting bracket 171 by means of a rod 176 projecting from the opposite sides of each gage head 141 into engagement with axially aligned apertures 177 through a pair of ears 178 either formed integrally with or fixedly secured to each of the gage head mounting clamps 142 and to gage head supporting bracket 171 so that each gage head may assume the precise angular position determined by the setting of an adjustable stop 179 projecting into engagement with the adjoining gage head from each of clamps 142 or bracket 171.

Work Loader Mechanisms

The workpieces to be ground comprising crankshafts disposed at the several pick-up stations on the conveyor mechanism assembly 20 serving the respective work stations 1 through 6 are removed from these stations and delivered to the machines at the respective work stations by work loading, transferring and discharging apparatus of the type illustrated and described in detail in Narel Patent Re. No. 24,885 replacing Patent No. 2,813,380, issued November 19, 1957. These workpieces comprising crankshafts are replaced at the several pick-up stations on the conveyor mechanism assembly 20 by crankshafts upon which the machining operation has been performed at the respective stations, deposited by the same work loading, transferring and discharging apparatus. Since the significant structural features of such work loading, transferring and discharging apparatus, hereafter referred to simply as work loader mechanisms, have been illustrated and described in detail in Narel Patent Re. No. 24,885 replacing Patent No. 2,813,380, these mechanisms, generally designated by the reference numeral 201, employed at stations 1 through 6 of the instant invention will not be described in detail in this application.

In all major respects the work loader mechanism for work station 7, generally designated by reference numeral 201', is identical to the several other work loader mechanisms generally designated by reference numeral 201, and is composed of identical component parts including a pair of elongated spaced parallel horizontally disposed transverse rails 202 and 203, supported at their opposite ends by vertical end frames 204 and 205, and in turn providing supporting surfaces for a carriage 206 movable along the transverse rails 202 and 203 upon roller assemblies 207, attached to carriage 206, and supporting a pair of coordinated work loader units 208 each provided with at least two work loader hooks 209 positioned for movement into engagement with workpieces comprising crankshafts for moving these workpieces between limit positions in engagement with the conveyor mechanism assembly 20 and the respective machine tools at the several work stations, illustrated as comprising grinding machines generally designated by the reference numerals 10 and 10'. All of the parts enumerated above are common to the respective work loader mechanisms 201 as well as to work loader mechanism 201'.

Since a single predetermined crankpin is always ground on each of the grinding machines 10 at work stations 1 through 6, the carriage 206 of each of the work loader mechanisms 201 serving these six stations always travels a fixed horizontal distance along transverse rails 202 and 203 between a predetermined position adjacent the conveyor mechanism assembly 20 and a predetermined position adjacent the grinding machine 10, the means for limiting the travel of carriage 206 on work loader mechanisms 201 may be arranged in the manner illustrated in FIGS. 2 and 8 of Narel Patent Re. No. 24,885 replacing Patent No. 2,813,380. On the other hand, the longitudinally adjustable table of grinding machine 10', of the general type illustrated in Mader Patent No. 2,723,503 issued November 15, 1955, is adjustable longitudinally relative to rails 202 and 203 to position a crankshaft longitudinally for grinding any one of six crankpins. In order to modify the length of travel of the carriage 206 by an amount corresponding to the selected position of the longitudinally adjustable table of grinding machine 10', an adjustable carriage stop means must be provided. This adjustable carriage stop means may conveniently comprise the structural arrangement best illustrated in FIGS. 13 and 14 and also shown in FIG. 3, described in detail below.

In the illustrative embodiment of the instant invention, the adjustable carriage stop means comprises a longitudinally adjustable carriage stop rod 211 positioned in axial alignment with and so that it engages a valve stem 212 projecting from a slow-down valve assembly 213 fixedly secured to carriage 206 and arranged as illustrated in Narel Patent Re. No. 24,885 replacing Patent No. 2,813,380 so that the valve stem 212 ultimately bottoms to form a positive stop. The adjustable carriage stop rod 211 is supported between and parallel to the transverse rails 202 and 203 by a rod supporting bracket 214, provided with a hole 215 slidably engaging rod 211 and mounted on a cross member 216, and by a guide block 217, having a hole 218 slidably engaging rod 211 and supported upon the upper end of vertical end frame 204. The position of stop rod 211 is controlled by a stop rod positioning lever 221 supported intermediate its ends on a pivot pin 222 projecting from a bracket 223 secured to a cross bar 224. The upper end of the stop rod positioning lever 221 is connected by a pivot pin 225 to a link 226 connected at its other end to a pivot pin 227 projecting from a collar 228 fixedly secured to the carriage stop rod 211 as shown best in FIG. 13. For convenience in properly positioning stop rod 211, the lower end of the manually operable stop rod positioning lever 221 is disposed adjacent to an elongated scale 229 secured to and projecting from the vertical end frame 204 and provided with a series of numbers corresponding to the respective crankpins which may be ground on grinding machine 10' at work station 7. In order to maintain the stop rod 211 in the precise position selected by actuation of the positioning lever 221, the stop rod 211 is provided with a series of six annular grooves 231, any one of which may be engaged by a latch mechanism generally designated by reference numeral 232 including a pair of opposed arms 233 respectively provided with opposed semi-circular jaws 234 and supported for rotation about a common horizontal axis by a pivot pin 235 projecting from an up-standing ear 236 formed integrally with or attached to rod supporting bracket 214. The respective arms 233 are interconnected by a tension spring 237 normally operable to bias the respective semi-circular jaws 234 into engagement with the stop rod 211 and into interfitting engagement with any one of the annular grooves 231 in rod 211 when one of these grooves is positioned in alignment with the latch mechanism 232 by actuation of the positioning lever 221. In order to provide for repositioning the stop rod 211, the opposed arms 233 of latch mechanism 232 are interconnected by a pair of toggle links 241 pivotally connected to one end of bell crank 242 rotatable about a horizontal axis supproted upon a pivot pin 243 projecting from rod supporting bracket 214 and connected by means of a tie rod 244 to a bell crank 245 supported for rotation about a parallel axis on pivot pin 246 projecting from a bracket 247 on cross member 216. The toggle links 241 are rotated into mutual alignment to open the semi-circular jaws 234 on the arms 233 by upward displacement of the manually controlled push rod 248 dependent from the other end of bell crank 245 and preferably disposed adjacent to the lower end of stop rod positioning lever 221.

Grinding Machines

Referring now particularly to the showing in FIG. 4 illustrating the preferred embodiment for performing a machining operation at work station 1, a workpiece comprising a crankshaft is shown supported and positioned for grinding crankpin #1 on a grinding machine generally designated by reference numeral 10. The means for properly positioning, supporting and driving the workpiece is a conventional arrangement not part of the instant invention including left hand and right hand work drive assemblies generally designated by the reference numerals 251 and 252, respectively, supporting a left hand face plate assembly 253 and a right hand face plate assembly 254 for synchronous rotation about a common horizontal axis parallel to the axis of rotation of the grinding wheel. The face plate assemblies 253 and 254 respectively support a left hand pot chuck or work holder assembly 255 and a right hand pot chuck or work holder assembly 256 including various components for precisely positioning, supporting and clamping a workpiece comprising a crankshaft in such a position that the crankpin to be ground is disposed with its axis coincident with the common axis of rotation for the respective face plate assemblies 253 and 254. The synchronous rotation of the respective face plate assemblies is accomplished by a suitable work driving means including components contained in and interconnecting the respective work drive assemblies 251 and 252 and connecting the respective work drive assemblies to the work drive motor 257. The details of the work drive means are neither illustrated nor described herein since they may comprise any conventional and well known arrangement for this purpose, not considered a part of the instant invention. The structural arrangement described above necessarily also includes any suitable conventional arrangement for stopping the face plate assemblies 253 and 254 precisely in a predetermined angular orientation during the interval in which a ground crankshaft is removed from the pot chucks and a crankshaft to be ground is deposited in the pot chucks.

The illustration in FIG. 4 of the arrangement at work station 1 is typical of the arrangement at each of work stations 1 through 6 with one exception. At each of the other work stations the work drive assemblies 251 and 252 are positioned and fixedly secured at points on the bases of the respective grinding machines 10 at the locations which will result in disposing the crankpin to be ground at each station in line with the grinding wheel at that station. For example, the dotted partial outline generally designated by reference numeral 252' indicates the position on the base in which the right hand work drive assembly 252 would be secured at work station 6 for grinding crankpin #6.

Considerations for Positioning Work Loader Mechanisms and Grinding Machines

The structural details of the pot chuck or workholder assemblies 255 and 256 are not included herein, because any such assemblies suitable for operation in cooperation with automatic work loader mechanisms of the type disclosed may be mounted in appropriate positions on the respective face plate assemblies 253 and 254. For example, the pot chucks 255 and 256 may include the features illustrated and described in copending application Serial No. 775,007 of Stephen H. Smith for "Crankpin Grinding Apparatus" filed November 19, 1958, now Patent No. 2,950,586 issued August 30, 1960. Embodying the teachings of Smith in this apparatus, the left hand pot chuck 255 at station 1 would be arranged as shown in FIG. 2 of the referenced Smith patent to properly position crankpin #1 for grinding; the left hand pot chuck 255 at station 2 would be arranged as shown in FIG. 5 of the Smith patent to properly position crankpin #2 for grinding; the left hand pot chuck 255 at station 3 would be arranged as shown in FIG. 4 of the Smith patent to properly position crankpin #4 for grinding; the left hand pot chuck 255 at station 4 would be arranged as shown in FIG. 6 of the Smith patent to properly position crankpin #3 for grinding; the left hand pot chuck 255 at station 5 would be arranged as shown in FIG. 7 of the Smith patent for properly positioning the crankpin #5 for grinding; and the right hand pot chuck 256 at station 6 would be arranged as shown in FIG. 8 of the Smith patent for properly positioning the crankpin #6 for grinding. At each of these stations the pot chuck mounted on the opposing face plate assembly would be mounted in precise axial alignment with the other pot chuck for clamping engagement with a main bearing at the opposite end of the crankshaft. However, the latter pot chuck assemblies would omit the feature illustrated in the respective figures of the Smith patent referred to for engaging and accurately angularly positioning crankpin #6 at stations 1 through 5 and crankpin #1 at station 6.

All of these pot chuck arrangement are oriented as illustrated in the Smith patent to receive crankshafts angularly oriented about their longitudinal axes in the attitude in which the crankshafts are maintained as they are advanced along the portions of the conveyor mechanism assembly 20 adjoining and serving work stations 1 through 6. Noting that the respective crankpins are equally spaced about the longitudinal axis of each crankshaft in the arrangement illustrated in FIG. 10, it becomes apparent that the respective work holders 255 and 256 at the respective work stations must be mounted on the respective face plate assemblies 253 and 254 offset in various angular relationships from the axis of rotation of the face plate assemblies when the angular orientation of the crankshafts remains constant as they pass through the various work stations. These diverse angularly offset relationships between the work holders and the face plates at the respective work stations are clearly illustrated in FIGS. 2 and 5 through 8 in the copending application Serial No. 775,007 of Stephen H. Smith, now Patent No. 2,950,586. The respective angularly offset relationships between the crankshaft main bearings and the crankpin to be ground at the several work stations are discussed below in terms of the horizontal spaced relationships and the vertical spaced relationships at the various work stations which together are definitive of the angularly offset relationships characteristic of the spatial orientation of the crankshafts at the respective work stations.

Considering first the horizontal spaced relationship at work stations 1 through 6, the main bearings engaged by the pot chucks are in vertical alignment with crankpins #1 and #6 ground at work stations 1 and 6; they are offset to the left as seen in FIG. 17 of crankpins #2 and #5 at work stations 2 and 5, and they are offset to the right as seen in FIG. 17 crankpins #4 and #3 at work stations 3 and 4. This variation in the horizontal spaced relationship between the main bearings of the crankshaft and the crankpin to be ground is accommodated at the various stations in the manner described below.

The horizontal spaced variation noted above necessitates modification of the relative orientation of the structure comprising the work loader mechanism 201 and the structure comprising the grinding machine 10 at the various work stations. The crankshaft to be ground supported by the right hand pair of work loader hooks 209 as seen in FIG. 5 is supported and displaced by these hooks so that its longitudinal axis about which the main bearings are concentric travels in a first vertical plane, in fixed relation to the structure of the work loader mechanism, into engagement with the pot chuck assemblies 255 and 256. The common horizontal axis about which the respective face plate assemblies 253 and 254 of the grinding machine 10 rotate may be considered to lie within a second vertical plane in fixed relation to the structure of the grinding machine and parallel to the first. At work stations 1 and 6 the work loader mechanism 201 and the grinding machine 10 are so disposed that these first and second planes coincide, since the crankpins to be ground at these stations are in vertical alignment with the main bearings of the crankshaft. At work stations 2 and 5 the grinding machine 10 is positioned offset to the right as seen in FIG. 5 from the work loader mechanism 201 so that the respective reference planes are spaced apart by an amount equal to the horizontal spacing between the crankpins ground at these stations and the main bearings of the crankshaft. At station 3 and 4 the grinding machine 10 is positioned offset to the left as seen in FIG. 5 relative to the work loader mechanism 201 by an equal amount for the same reason.

Where displacement of the grinding machine 10 relative to the work loading mechanism 201 is required for the reasons noted above as at work stations 2 through 5, this displacement is achieved by actually relocating the grinding machine rather than the work loader mechanism 201, since the first vertical reference plane referred to above in which the longitudinal axis of a crankshaft supported by work loader hooks 209 moves must also be centered on the workpiece supporting brackets 45 and 46 at the pick-up station on the conveyor mechanism for the work station served by that work loader. Hence the position of the respective work loader mechanisms 201 longitudinally of the conveyor mechanism assembly 20 is necessarily fixed by the necessity for maintaining the proper vertical alignment between the respective pick-up stations on the conveyor mechanism and the work loader hooks 209 on the respective work loader mechanisms.

Considering next the vertical spaced relationship between the main bearings and the crankpin to be ground at the various work stations, this vertical spaced relationship at work station 1 is represented on FIG. 17 by the vertical distance between the datum line D and the reference line P. The corresponding vertical spaced relationship at work stations 2 through 6 is illustrated in FIG. 17 by the orientation of a cross hatched representation of the crankshaft main bearing relative to the orientation of each of the respective crankpins #2 through #6. The respective vertical spaced relationships illustrated in FIG. 17 at work stations 2 through 6 are those required for proper orientation of the work pieces comprising crankshafts in the respective work holders for proper orientation of the crankpins to be ground at the respective work stations. In the preferred embodiment of this invention, this vertical spaced relationship is also maintained on the conveyor mechanism assembly by varying the height of the workpiece supporting brackets on the respective portions of the conveyor mechanism adjoining the various work stations, in the manner illustrated by the simplified representation in FIG. 17.

With this arrangement of the conveyor mechanism the crankshafts can be transferred from the conveyor mechanism to the respective grinding machines by a lateral transfer from a position on the conveyor mechanism to a position in the work holders of a grinding machine without any net change in the vertical orientation of the main bearings. Therefore the respective pairs of work loader hooks 209 of the respective work loader mechanisms 201 may be moved in opposite directions in vertical planes through the same generally U-shaped paths at each end of the operating cycle of the work loader mechanisms, in the manner described in Narel et al. Patent Re. No. 24,885 replacing Patent No. 2,813,380 and best illustrated in FIG. 4 thereof.

The variation from work station to work station of the vertical spaced relationship between the main bearings of the crankshaft and the crankpin to be ground is conveniently accommodated at each work station by suitable vertical adjustment of the respective vertical end frames 204 and 205 relative to base brackets 261, best illustrated in FIGS. 4 and 5, provided with a plurality of elongated vertical slots 262 therethrough arranged to accommodate a corresponding plurality of attachment screw 263 projecting through the respective elongated slots 262 into threaded engagement with the vertical end frames 204 and 205. In the course of installing each loader mechanism 201 at work stations 2 through 5, the respective vertical end frames thereof are first positioned vertically by suitable lifting means such as jack screws and thereafter the attachment screws 263 are tightened to maintain the entire work loader mechanism 201 in the desired vertical spaced relation to the cooperating grinding machine 10 and the cooperating pick-up station on the conveyor mechanism assembly 20 so that the U-shaped paths followed by the respective work loader hooks 209 during operation of the respective work loader units 208 supported by the carriage 206 on each work loader mechanism 201 are so disposed and oriented that the respective work loader hooks 209 are effectively engaged with and disengaged from the workpieces supported at the pick-up station on the conveyor and in the work holders of the grinding machine.

Special consideration must be given to the configuration of the pot chucks or work holders on grinding machine 10' at work station 7, in view of the fact that the crankshaft indexing mechanism illustrated in FIGS. 3, 8, 9 and 10 and generally designated by the reference numeral 181 rotates all crankshafts to be ground at work station 7 so that the crankpin to be ground at that station is oriented vertically above the main bearings of the crankshaft in the position occupied by crankpin #1 in FIG. 10 which corresponds to the orientation of the crankpin to be ground at work station 1 as illustrated in FIG. 17. In fact, the orientation of grinding machine 10' longitudinally of the conveyor mechanism relative to the work loader mechanism 201' at work station 7 corresponds to the relative relationship longitudinally of the conveyor mechanism between the grinding machine 10 and the work loader mechanism 201 at work station 1. That is, the vertical plane of reference through the work loader mechanism 201' in which the longitudinal axis of a crankshaft moves as it is loaded into grinding machine 10' is disposed coincident with the vertical plane of reference containing the axis of rotation of the face plate assemblies 253 and 254 of grinding machine 10'. Moreover, the work loader mechanism 201' at work station 7 is positioned vertically relative to the respective base brackets 261 in the same location as the work loader mechanism 201 at work station 1.

Crankpin #1 may be properly positioned for grinding at work station 7 by employing a work holder of the type illustrated in copending application Serial No. 775,007, now Patent No. 2,950,586 of Stephen H. Smith, on the left hand face plate assembly 253 in the manner illustrated in FIG. 2 of application Serial No. 775,007, now Patent No. 2,950,586, so that the precise positioning means engages crankpin #6 in the manner illustrated in FIG. 2. Crankpin #6 can be properly positioned for grinding at work station 7 by employing a work holder of the type illustrated in FIG. 2 in application Serial No. 775,007, now Patent No. 2,950,586, of Stephen H. Smith on the right hand face plate assembly 254 in the position illustrated in FIG. 8 of application Serial No. 775,007, now Patent No. 2,950,586, so that the precise positioning means engages crankpin #1 instead of crankpin #6 in the manner illustrated in FIG. 2. In each of these arrangements the work holder mounted on the opposite face plate to support the other end of the crankshaft is similarly disposed, but omits the precise positioning means illustrated in FIG. 2 of application Serial No. 775,007, now Patent No. 2,950,586.

Since each crankpin to be ground at work station 7 is positioned vertically above the main bearings of the crankshaft for the grinding operation by crankshaft indexing mechanism 181, the precise positioning means illustrated in application Serial No. 775,007, now Patent No. 2,950,586, is not suitable for supporting crankpins #2 through #5 for grinding at work station 7. Therefore a modified configuration of the work holders and precise positioning means such as that illustrated in copending application Serial No. 26,536 of Stephen H. Smith, filed May 3, 1960, now Patent No. 3,034,268 issued May 15, 1962, is required for grinding crankpins #2 through #5 at work station 7.

Crankpin #2 may be properly positioned for grinding at work station 7 by employing a work holder and precise positioning means arranged and disposed on left hand face plate assembly 253 as illustrated in FIG. 5 of application Serial No. 26,536, now Patent No. 3,034,268, and by employing a work holder and precise positioning means arranged and disposed on the right hand face plate assembly 254 as illustrated in FIG. 6 of application Serial No. 26,536, now Patent No. 3,034,268. It will be noted that the respective precise positioning means illustrated in FIGS. 5 and 6 of application Serial No. 26,536, now Patent No. 3,034,268, acting in opposite directions about the longitudinal axis of the crankshaft by engagement with crankpins #6 and #1, respectively, coact to achieve the desired precise positioning of crankpin #2.

Similarly, crankpin #3 is properly positioned for grinding at work station 7 by employing work holders and precise positioning means arranged and disposed on face plate assemblies 253 and 254 as illustrated in FIGS. 3 and 4, respectively, of application Serial No. 26,536, now Patent No. 3,034,268. Crankpin #4 may be properly positioned for grinding at work station 7 by employing work holders and precise positioning means arranged and disposed on face plates 253 and 254 as illustrated in FIGS. 1 and 2, respectively, of application Serial No. 26,536, now Patent No. 3,034,268. Crankpin #5 may be properly positioned for grinding at work station 7 by employing work holders and precise positioning means arranged and disposed on face plates 253 and 254 as illustrated in FIGS. 7 and 8, respectively, of application Serial No. 26,536, now Patent No. 3,034,268.

Operation of the Conveyor Mechanism

In order that the significant features of the instant invention may be most fully appreciated, the operation of the conveyor mechanism incorporated in the instant invention and the control means for initiating and regulating this operation will be described in detail below with particular reference to the showing in FIG. 16 and the showing in FIG. 17. The showing in FIG. 16 includes schematic representations of the various electrical components included in the control system for the conveyor mechanism of the instant invention, and various electrical elements associated with a representative pick-up station typical of corresponding electrical elements at each pick-up station, as well as the electrical elements of the gaging circuit for a single representative pick-up station. Since many of the electrical elements of the gaging circuits including the gage head 141 are contained within commercially available gaging apparatus, such elements are enclosed in FIG. 16 within a dotted outline generally designated by the reference letter A. This arrangement of electrical elements of the gaging apparatus for work station 1 is typical of the gaging apparatus for each of the seven work stations, shown in FIG. 17 simply as boxes identified by the reference letters A through G. In contrast to the simplified schematic showing in FIG. 16 limited to a typical gaging circuit for workpieces ground at a single work station, the entire electrical control circuit for the conveyor mechanism including elements cooperating with all seven work stations is illustrated in FIG. 17, but simplified to the extent noted above by the omission of numerous details of the electrical circuits within the seven gaging units designated by the letters A through G. FIG. 17 also includes schematic representations of the various mechanically actuated elements incorporated in the electrical control system such as various limit switch assemblies having rotatable arms projecting therefrom into engagement with various mechanical components of the conveyor mechanism assembly. Finally, FIG. 17 includes a schematic representation of the various pneumatically and hydraulically operated actuating cylinders for selectively displacing various mechanical elements of the conveyor mechanism assembly 20 in response to signals from the electrical control system operable to produce a suitable response in the several actuating cylinder control means incorporated in the pneumatic and hydraulic systems of the instant invention. The various limit switch assemblies and the pneumatically and hydraulically operated actuating cylinders are also shown in various other figures positioned in the proper relationship to the various elements of the conveyor mechanism assembly 20 with which they cooperate. In the course of the following description reference will be made as necessary to these additional showings in order to facilitate an understanding of the control system described below.

Referring particularly to FIGS. 16 and 17, closing the main switch SW1 supplies power to the system across lines L1 and L2. Closing switch SW2 readies the circuit for moving the conveyor mechanism when such movement is initiated under the conditions and in the manner described below. Closing switch SW3 energizes and thereby readies the gaging circuit best illustrated in FIG. 16. The illumination of amber light LA by closing switch SW3 indicates the ready status of the gaging circuit.

In order to initiate operation of the conveyor mechanism spring-biased normally open push button PB1 must be closed momentarily to energize relay M1 to close a first set of contacts and thereby energize the drive motor M of an hydraulic pump arranged to maintain hydraulic pressure in the system. When relay M1 is energized by closing PB1 a second set of contacts is also closed, whereby a holding circuit is established to maintain relay M1 energized and the circuits connected to lines L1A and L1B are also energized. When line L1A is energized control relay CR87 is energized to close a pair of normally open contacts. Conversely, the control system for the conveyor mechanism may be deenergized by momentarily depressing spring-biased normally closed push button PB2 in order to deenergize relay M1 and thereby deenergize the drive motor M of the hydraulic pump and lines L1A and L1B.

Prerequisities for Conveyor Operation

In order for the conveyor mechanism assembly to function properly and in proper relation to the cooperating work loader mechanisms and the several grinding machines served thereby, it is necessary that means be provided for sensing and responding to the various conditions which are necessary prerequisites to the successful operation of the conveyor mechanism assembly 20.

At the beginning of a cycle of operation the elongated reciprocating portion of the conveyor mechanism assembly 20 including the side rails 31, 32 and 33, cross members 34 and 34′, end plates 35 and 35′, and the respective tie rod assemblies 36 is disposed in its retracted position, that is moved to the left as viewed in FIGS. 1, 2, 3 and 17, by operation of the actuating cylinder 71 shown best in FIGS. 3, 8 and 17 so that piston 72 is disposed at the left hand end of cylinder 71 as shown in FIG. 17. With the reciprocating portion of the conveyor mechanism so disposed, the normally open contacts of the limit switch LS68 are held closed and the normally closed contacts of limit switch LS68 are held open as shown in FIGS. 16 and 17. Therefore, when line L1A is energized, control relay CR86 is energized and the two pairs of normally open contacts controlled thereby are held closed.

At the same time, the rotating portion of the conveyor mechanism including the several pivotally mounted bell crank assemblies 51 and the push-pull rod assemblies 67 interconnecting the respective bell cranks are positioned with the arms 52 of the respective bell cranks disposed substantially horizontally, as shown best in solid lines in FIGS. 5, 6, 8 and 17, by operation of the bell crank actuating cylinder 81 so that the piston 82 is positioned at the left hand end of cylinder 81 as shown in FIG. 17. With piston 82 so disposed, limit switch LS71 is positioned so that its normally open contacts are held closed and its normally closed contacts are held open as shown in FIGS. 16 and 17.

As a necessary prerequisite to effective operation of the conveyor mechanism, a workpiece comprising a crankshaft must have been placed on the workpiece supporting brackets at the infeed or input end of the conveyor mechanism at the left in FIGS. 1, 5 and 17. With a crankshaft so positioned, as shown in FIG. 5, the arm of limit switch LS67 is depressed so that its normally open contacts are held closed.

Another condition for the safe operation of the conveyor mechanism is the removal of a workpiece comprising a crankshaft from the discharge or output end of the conveyor mechanism at the right in FIGS. 3, 8 and 17. This condition is detected by limit switch LS66 disposed as shown best in FIG. 17 so that its normally closed contacts are closed if the workpiece has been removed, but remain open if the workpiece has not been removed.

The last prerequisite for effective operation of the conveyor mechanism is the requirement that workpieces having their various crankpins ground to the correct dimensional tolerances at the respective operating work stations must have been deposited at the several pick-up stations on the conveyor mechanism serving the respective operating work stations. The several gaging mechanisms described above are actuated in the manner described below in order to determine whether or not this condition is fully met.

Noting that work station 7 can be substituted for any one of work stations 1 through 6 in the operation of the apparatus comprising the instant invention, the following description will describe the various electrical elements of the control circuits at the several work stations by referring to a group of six reference numerals identifying each such element for each of the work stations 1 through 6 and referring alternatively to the corresponding element of the control circuit for work station 7. For example, a typical statement will refer to specific elements 1, 2, 3, 4, 5 and 6, or 7. All such statements should be interpreted to mean that element 7 is substituted for any one of elements 1 through 6 when work station 7 is functioning in place of the particular work station with which that element is associated. Moreover, the first reference numeral in each series identifies the element located at work station 1 which appears in FIG. 16 as well as in FIG. 17. Therefore, the following description of the various electrical elements and their operating relationship may conveniently be followed in FIG. 16 with respect to work station 1, which is exemplary of the corresponding arrangement at the several work stations.

*Operation of the Gaging Apparatus*

The operation of the gaging apparatus adjoining the respective pick-up stations is initiated as the pair of work loader hooks 209 on the left in FIG. 5 and illustrated schematically in FIG. 17, starting from the position illustrated in FIG. 17 with a ground shaft resting on the hooks 209, move downwardly and then clockwise as seen in FIGS. 5 and 17 to deposit the ground shaft on the workpiece supporting brackets at the pick-up station on the conveyor mechanism and continue upwardly to the position shown in dotted lines in FIG. 5. As the work loader hooks 209 reach the position shown in FIG. 5 at the respective work stations, limit switches LS52, LS54, LS56, LS58, LS60 and LS62 or LS64, all illustrated in FIG. 17, are actuated in the manner illustrated in FIG. 5 with respect to LS52. The actuation of these limit switches momentarily closes the normally open contacts thereof to energize relays CR50, CR53, CR56, CR59, CR62 and CR65, or CR68. The momentary energization of each of these control relays closes a first set of contacts to energize one of a series of solenoids S50, S51, S52, S53, S54 and S55, or S56. Energization of each of these solenoids shifts the shuttle valve controlled thereby which allows air under pressure to flow to one end of each of a series of air operated gage head supporting frame actuating cylinders 161 to displace a piston 162 to the left as shown in FIG. 17 to swing the U-shaped gage head supporting frame 145 actuated thereby counter-clockwise as shown in FIGS. 5, 6 and 17 to position the gage head 141 supported thereby in operative engagement with the crankpin ground at that work station.

The momentary energization of relays CR50, CR53, CR56, CR59, CR62 and CR65, or CR68 also closes a second pair of normally open contacts which respectively energizes a series of control relays CR51, CR54, CR57, CR60, CR63 and CR66, or CR69. Holding circuits for the last named series of control relays are set up through a first pair of normally open contacts of each of these relays and through a series of normally closed contacts of a control relay CR80 to hold the respective relays CR51, CR54, CR57, CR60, CR63 and CR66, or CR69 energized. The energization of each of the control relays CR51, CR54, CR57, CR60, CR63 and CR66, or CR69 also closes a second pair of normally open contacts connected in series with one of a group of control relays CR52, CR55, CR58, CR61, CR64 and CR67, or CR70 so that these control relays can be energized and function in the manner described further below upon successful completion of the gaging operation at each pick-up station.

As the respective gage head supporting frames 145 start to rotate counter-clockwise as shown in FIGS. 5, 6 and 17, they release the actuating arms of a series of limit switches LS53, LS55, LS57, LS59, LS61 and LS63 or LS65 so that normally open contacts of these limit switches all connected in series with control relay CR87 are allowed to open, thereby deenergizing CR87. As the respective gage heads 141 are moved into engagement with the respective crankpins to be gaged by continuing counterclockwise rotation of the respective gage head supporting frames 145, another series of limit switches LS, LS2, LS3, LS3, LS4, LS5 and LS6, or LS7 are actuated to hold open a pair of normally closed contacts and to hold closed a pair of normally open contacts. When the respective normally open contacts are closed, the control relay CR1 of each gaging apparatus A, B, C, D, E and F, or G is energized. While all of the limit switches LS1, LS2, LS3, LS4, LS5 and LS6, or LS7 are illustrated in FIG. 17, only limit switch LS1 and the electrical elements of gaging apparatus A are illustrated in FIG. 16 as representative of the identical elements included in each such gaging apparatus. A suitable mounting arrangement of the limit switches LS53 and LS1 on an elongated side frame 22 adjoining work station 1 is illustrated in FIG. 5 and the arrangement of limit switches LS63 and LS6 on the elongated side frame 22 adjoining work station 6 is illustrated in FIG. 6.

The following description of the operation of a typical gaging apparatus may best be considered in relationship to the showing in FIG. 16. When CR1 is energized, a first pair of normally open contacts is closed to energize a time delay relay TR1, which is timed to close its normally open contacts after energization with a time delay of about two seconds. By means of this time delay, TR1 gives the air gage contained in gage head 141 time to stabilize before a reading is taken. When the normally open contacts of TR1 are closed, another time delay relay TR2 is energized to open a pair of normally closed contacts and to close a pair of normally open contacts. TR2 is also timed after its energization for a longer timing period than TR1. At the same time that TR2 is energized by closing the normally open contacts of TR1, control relay CR3 is energized through the normally closed contacts of TR2 and a clear white light LW is energized. When CR3 is energized, the normally open contacts thereof are closed to energize control relay CR2, closing three normally open sets of contacts, one of which establishes a holding circuit for CR2, another of which is connected in series with the normally closed contact of LS1, and the third of which supplies current to the normally open gage contacts, including those for the first diameter, the second diameter, the third diameter and taper, and the several normally closed gage contacts for detecting incorrect crankpin dimensions, as shown in FIG. 16.

If the ground crankpin is not dimensionally correct in every respect, at least one of the parallel connected normally closed contacts will stay closed so that a red light LR remains illuminated and control relay CR6 remains energized to hold open a pair of normally closed contacts in the line connected to a circuit controlling the cyclic operation of the work loader mechanism and the associated grinding machine. If the ground crankpin being gaged is dimensionally correct in every respect, all of the series connected normally open contacts of the air gage in a given gaging apparatus will close to energize a control relay CR5 and a green light LG. When CR5 is energized in the gaging apparatus at each of the pick-up stations adjoining all of the work stations in operation, a series of control relays CR52, CR55, CR58, CR61, CR64 and CR67, or CR70 will be energized to close their respective normally open contacts which are wired in series to energize control relay CR78 to close first and second sets of normally open contacts to ready the control circuit for initiation of an operating cycle of the conveyor mechanism assembly 20.

The control relay CR6 may also be arranged to perform an additional function indicated generally in FIG. 16 by a line connected adjacent to the contacts of CR6 identified by the legend "To Wheel Slide Retract." Since the grinding operation at each work station is undertaken on the succeeding workpiece during this post-process gaging operation, it is desirable to interrupt this succeeding grinding operation before it is completed if the post-process gaging operation indicates that the previously ground workpiece being gaged is not properly dimensioned in all respects. Hence, the line so designated shown in FIG. 16 may be connected to suitable elements in the control circuit for the grinding machine to interrupt the infeed cycle for the grinding wheel slide and automatically initiate retraction of the grinding wheel slide, in order to avoid the possibility of producing an additional unsatisfactory workpiece.

The closing of the first set of normally open contacts of CR78 connected in series with control relay CR79 prepares the circuit containing CR79 for energization of CR79 when control relay CR87 is again energized in the manner described below upon completion of the gaging operation for all work stations in operation. The closing of the second set of normally open contacts of CR78 connected in series with the normally closed contacts of limit switch LS66 energizes control relay CR85 to close first and second sets of normally open contacts. With the first set of contacts of CR85 closed, solenoid S66 is energized to close a relief by-pass valve in the hydraulic system and thereby supply the hydraulic fluid pressure required to move the conveyor mechanism. With the second set of contacts of CR85 closed, a holding circuit is established to maintain CR85 energized and thereby maintain solenoid S66 energized. This holding circuit by-passes the contacts of control relay CR78 but is controlled by the normally closed contacts of limit switch LS66. Therefore this holding circuit maintains CR85 energized when CR78 is deenergized but deenergizes CR85 and S66 at the end of the cycle of operation for the conveyor mechanism when a workpiece is deposited upon the workpiece supporting brackets at the discharge or outlet end of the conveyor mechanism so that the normally closed contacts of limit switch LS66 are held open. The arrangement for actually initiating a cycle of operation by the conveyor mechanism is described in detail further below.

As noted above, time delay relay TR2 times out at a predetermined time interval after it has been energized, opening a set of normally closed contacts to deenergize control relay CR3 and closing a set of normally open contacts to energize control relay CR4 through one set of the now closed normally open contacts of CR1. When each control relay CR4 is energized, it closes its normally open contacts to energize one of a series of control relays CR71, CR72, CR73, CR74, CR75 and CR76, or CR77 which respectively energize one of a series of solenoids S57, S58, S59, S60, S61 and S62, or S63 to move a shuttle valve in the opposite direction to pass pressurized air to the other end of one of a series of gage head supporting frame actuating cylinders 161 to move a piston 162 to the right to the position shown in FIG. 17 in order to rotate the gage head supporting frame 145 actuated thereby clockwise into the retracted position illustrated in FIGS. 5, 6 and 17. As retraction of the respective gage heads 141 from their operative position is initiated by clockwise rotation of the respective gage head supporting frames, the actuating arms of the series of limit switches LS1, LS2, LS3, LS4, LS5 and LS6, or LS7 are released, opening their normally open contacts and closing their normally closed contacts. As each of these normally open contacts is opened, various elements of the gaging apparatus associated therewith including CR1, TR1 and CR4, are deenergized resulting in deenergization of the respective control relays CR71, CR72, CR73, CR74, CR75 and CR76, or CR77 and deenergization of the respective solenoids S57, S58, S59, S60, S61 and S62, or S63 controlled thereby. The respective normally closed contacts of these limit switches are so arranged that they close as, or before, the respective normally open contacts of these limit switches are opened. Therefore, a circuit is established through each normally closed contact to hold the control relay CR2 energized through a first set of contacts of CR2, through reset switch SW4 and through a second set of contacts of CR2. The same normally closed contacts of these limit switches als oserve to maintain the energization of time delay relay TR2 through switch SW3B and to maintain CR5 or CR6 energized with light LG or LR illuminated. This signal is maintained in the gaging apparatus at each station until the gage head 141 is moved into engagement with the next crankpin to be gaged at that station when the normally closed contacts of limit switches LS1, LS2, LS3, LS4, LS5 and LS6, or LS7 will be opened thereby deenergizing and resetting time delay relay TR2, and deenergizing control relay CR5 or CR6 at each of the respective stations.

*Operating Cycle of the Conveyer Mechanism*

Proceeding with a detailed description of the operating cycle of the conveyor mechanism assembly 20, as the clockwise rotation of the respective gage head supporting frames 145 is completed with the gage heads 141 disposed in their inoperative position as shown in FIG. 17, the series of limit switches LS53, LS55, LS57, LS59, LS61 and LS63, or LS65 are actuated each closing a set of normally open contacts. Since the contacts of these limit switches are connected in series with control relay CR87, CR87 is energized when all of these contacts have been closed by retraction of the gage heads at all of the operating work stations. With the closing of a set of normally open contacts by energization of CR87, the circuit is completed through the normally closed contacts of limit switch LS66; the normally open contacts of limit switch LS71, now held closed as noted above; the normally closed contacts of limit switch LS69; a first set of normally open contacts, now closed by energization of control relay CR86; and a second set of normally open contacts now closed by the energization of control relay CR78 as noted above. Through this circuit thus established the control relay CR80 is energized and the control relay CR79 is energized to close first and second sets of normally open contacts. The first set of contacts closed by CR79 connected in series with the normally closed contacts of limit switch LS70 establishes a holding circuit for CR79 independent of the normally open contacts of CR78 so that CR79 remains energized independent of subsequent deenergization of CR78. The closing of this first set of contacts of CR79 also serves to maintain control relay CR80 energized. With CR80 energized to open its seven sets of normally closed contacts, the respective control relays CR51, CR54, CR57, CR60, CR63 and CR66, or CR69 are deenergized by interruption of the holding circuits therefor extending through these contacts. This results in deenergization of control relays CR52, CR55, CR58, CR61, CR64 and CR67, or CR70 to open their respective normally open contacts and thereby deenergize control relay CR78 without affecting energization of CR79 and CR85, both maintained energized by holding circuits independent of the contacts of CR78.

The closing of the second set of contacts controlled by CR79 energizes solenoid 64A to displace a control element in an hydraulic valve assembly V12 illustrated in FIG. 17 to the right as shown in FIG. 17 so that pressurized hydraulic fluid is supplied to the left hand end of the actuating cylinder 71 to drive piston 72 to the right as viewed in FIG. 17 and thereby move the reciprocating portion of the conveyor mechanism from the left hand end to the right hand end of its stroke.

The initial displacement of the reciprocating portion of the conveyor mechanism including the side rails 31, 32 and 33 releases the actuating arm of limit switch LS68 so that its normally closed contacts are closed and its normally open contacts are opened deenergizing control relay CR86. As the reciprocating portion of the conveyor mechanism reaches the right hand end of its stroke, it engages the actuating arm of limit switch LS69 to hold open its normally closed contacts and to hold closed its normally open contacts. With the normally open contacts of LS69 closed, control relay CR81 is energized to close first and second sets of normally open contacts, the first establishing a holding circuit for CR81 through the normally closed contacts of LS68 and the second energizing solenoid 65A in an hydraulic valve assembly V14 illustrated in FIG 17. When solenoid 65A is energized, a control element within valve assembly V14 is displaced to the right as seen in FIG. 17 so that pressurized hydraulic fluid is delivered to the left hand end of bell crank actuating cylinder 81 to displace the piston 82 to the right as viewed in FIG. 17. This displacement of the piston 82 produces counter-clockwise rotation of the respective bell crank assemblies 51 to lift the respective workpieces from the respective workpiece supporting brackets of the conveyor mechanism. As counter-clockwise rotation of the bell cranks is initiated, limit switch LS71 is released so that its normally open contacts are opened and its normally closed contacts are closed.

As the respective bell cranks approach the limit of their counter-clockwise rotation with the respective bell cranks positioned as indicated in dot-dash lines in FIGS. 6 and 8 with workpiece receiving jaws 53 in their uppermost positions, limit switch LS70 is actuated to hold open its normally closed contacts and hold closed its normally open contacts. When the normally closed contacts of LS70 are opened, control relay CR80 is deenergized and control relay CR79 is deenergized to deenergize solenoid 64A. When the normally open contacts of LS70 are closed, control relay CR82 is energized to close first and second sets of normally open contacts, the first of which establishes a holding circuit for CR82 through the now closed normally closed contacts of LS71 and the second of which energizes solenoid 64B in the hydraulic valve assembly V12 illustrated in FIG. 17. Energization of solenoid 64B displaces the control element in valve assembly V12 to the left as shown in FIG. 17 to supply pressurized hydraulic fluid to the right hand end of actuating cylinder 71 to return piston 72 to the position illustrated in FIG. 17 at the left hand end of cylinder 71. As the return movement of the reciprocating portion of the conveyor mechanism is initiated, the limit switch LS69 is released to open its normally open contacts and to close its normally closed contacts. As the reciprocating portion of the conveyor mechanism continues its return movement toward the position at the left hand end of its stroke as shown in FIG. 17, the normally closed contacts of limit switch LS68 maintain CR81 and solenoid 65A energized.

When the reciprocating portion of the conveyor reaches the left hand end of its stroke, that is, the position shown in FIG. 17, holding the limit switch LS68 is actuated, open its normally closed contacts to deenergize control relay CR81 and thereby deenergizing the solenoid 65A. At the same time, actuation of limit switch LS68 holds closed its normally open contacts energizing control relay CR86, to close a pair of normally open contacts so that control relay CR83 is energized, closing a pair of normally open contacts to energize solenoid 65B. The energization of solenoid 65B moves the control element in the valve assembly V14 to the left as shown in FIG. 17 to supply pressurized hydraulic fluid to the right hand end of actuating cylinder 81 to displace piston 82 to the left therein until it reaches the position illustrated in FIG. 17. This displacement of the piston 82 produces concurrent clockwise rotation of the several bell crank assemblies until they reach the respective positions illustrated in solid lines in FGS. 5, 6, 8 and 17. The initiation of clockwise rotation of the respective bell crank assemblies is accompanied by release of the actuating arm of limit switch LS70 so that its normally closed contacts are closed and its normally open contacts are opened. The opening of the normally open contacts of LS70 deenergizes control relay CR82 so that solenoid 64B is deenergized.

The closing of the normally open contacts of limit switch LS68 also results in energizing control relay CR84 to close a set of seven normally open contacts interposed in the control circuits for the respective grinding machines and the respective work loader mechanisms at the seven work stations in order to supply an initial impulse to ready these circuits for the initiation of the operating cycle at the respective work stations in operation. The normally open contacts controlled by CR84 are respectively connected in series with the normally open contacts of a series of limit switches LS50, LS50A, LS50B, LS50C, LS50D and LS50E, or LS50F. The showing of limit switch LS50E in FIGS. 6 and 7, disposed as shown in these views on the conveyor mechanism assembly adjacent to the pick-up station for work station 6, is typical and representative of the arrangement for each of the other limit switches LS50, LS50A, LS50B, LS50C, LS50D and LS50F. The actuating arm of LS50E is depressed to actuate the limit switch by a lever assembly 271 rotatably supported on a pivot pin 272 projecting from side rail 32 and biased clockwise as shown in FIG. 6 by spring 273 so that an adjustable stop 274 engages the upper surface of the side rail 32. The spring 273 normally supports the elongated lever assembly 271 so that the actuating rod 276, shown best in FIG. 7, secured intermediate the ends of lever 271 and projecting substantially vertically therefrom is positioned to be engaged and depressed by a crankshaft when it is deposited in the workpiece supporting brackets 45 and 46 at the pick-up station serving work station 6. Thus, when a workpiece is deposited at this pick-up station, the actuating rod 276 is depressed to rotate the lever assembly 271 counter-clockwise as viewed in FIG. 6 so that the arm engaging ear 277 projecting from the left hand end of lever assembly 271, as shown in FIG. 6, depresses the actuating arm of limit switch LS50E to hold closed a pair of normally open contacts. Thus limit switches LS50, LS50A, LS50B, LS50C, LS50D and LS50E, or LS50F located at the respective pick-up stations respond to the presence of a workpiece to be ground to activate the control circuits for the corresponding work loader mechanisms and grinding machines and conversely remain inactive to preclude initiation of an operating cycle at a given work station when for any reason there is no workpiece present at the pick-up station serving that work station.

When the respective bell crank assemblies 51 reach their lowest position, the limit switch LS71 is actuated to hold open normally closed contacts thereof deenergizing control relay CR82 and thence solenoid 64B; deenergizing control relay CR83 and thence solenoid 65B; and deenergizing control relay CR84. This completes a cycle of operation of the conveyor mechanism assembly 20. Moreover, the hydraulic system for operating the conveyor mechanism assembly is effectively deactivated upon completion of an operating cycle of the conveyor mechanism when a crankshaft is deposited on the workpiece supporting brackets at the discharge end of the conveyor mechanism. This result is achieved by limit switch LS66 disposed at the right hand end of the conveyor mechanism as shown in FIG. 17 so that this switch is actuated when a workpiece is deposited at the discharge station to open its normally closed contacts and thereby deenergize control relay CR85 and solenoid S66 to open the by-pass around the relief valve illustrated in FIG. 17 and thereby lower the hydraulic fluid pressure so that the conveyor mechanism cannot be cycled again until that crankshaft has been removed from the discharge station. Only when the workpiece has been removed from the discharge station is the limit switch LS66 allowed to close to reset the control circuit for another cycle of operation of the conveyor mechanism.

Selective Operation of Work Stations

When work stations 1 through 6 are operating automatically, as illustrated in FIGS. 16 and 17, the conveyor mechanism control circuit for each of these stations is arranged with the respective three position selector switch assemblies, SS5, SS6, SS7, SS8, SS9 and SS10 similarly disposed as shown in FIG. 17 and with selector switch SS11 in the conveyor mechanism control circuit for inoperative work station 7 disposed as shown in FIG. 17. In FIG. 16 illustrating the control circuit for work station 1, selector switch SS5 is shown in solid lines corresponding to its showing in FIG. 17 and in dotted lines in an alternative position corresponding to the position of SS11 in FIG. 17. Hence this dotted line showing in FIG. 16 is identified by the reference numeral SS11, although SS11 of the control circuit of work station 7 is not actually a part of the circuit illustrated in FIG. 16.

When the three position selector switch SS5 of the control circuit for work station 1 is rotated counter-clockwise from the position as shown in FIG. 17 and in solid lines in FIG. 16, the gaging apparatus may alternatively be operated manually by means of a pair of push buttons PB3 and PB4 each having normally open contacts. Thus, without completing a predetermined portion of a cycle of operation of the work loader mechanism 201 to close the normally open contacts of limit switch LS52, the control relay 50 may be energized by depressing push button PB4. This results in energizing solenoid S50 to initiate rotation of the gage head counter-clockwise into its operative position shown in dot-dash lines in FIG. 6. Thereafter, when push button PB3 is depressed, control relay CR71 is energized to energize solenoid S51 to initiate clockwise rotation of the gage head into its inoperative position as shown in FIGS. 5, 6 and 17.

Considering the deactivation of the control circuit for work station 1 in relation to the showing in FIG. 16 as representative of the deactivation of any one of work stations 1 through 7, the opening of SS5B connected in series with the normally open contacts of limit switch LS52 precludes automatic energization of control relay CR50 to energize solenoid S50 and thereby initiate the gaging cycle which is necessarily preliminary to initiation of an operating cycle of the conveyor mechanism. Similarly, the opening of contacts SS5A precludes alternative manual operation of the gaging apparatus in the manner discussed above. Finally, the closing of contacts SS5C by clockwise rotation from the position shown in FIG. 17 completes a circuit which by-passes the normally open contacts closed by energization of control relay CR52 in the control circuit at work station 1. With a by-pass provided in this manner, the normally open series connected contacts controlled by the energization of the control relays CR55, CR58, CR61, CR64, CR67 and CR70 may be closed by normal operation of the control circuits for the respective work stations 2 through 6 and stand-by station 7 in operation to complete the series circuit through these contacts so that control relay 78 may be energized in the usual manner to ready the circuit for an operating cycle of the conveyor mechanism. Although by-pass circuits for the respective contacts controlled by control relays CR55, CR58, CR61, CR64, CR67 and CR70 are not included in the limited showing in FIG. 16, it will be noted from the showing in FIG. 17 that the control circuit for each of work stations 2 through 7 includes such a by-pass circuit provided with a selector switch SS6, SS7, SS8, SS9, SS10 or SS11 including contacts corresponding to SS5C as shown in FIG. 16. It is for this reason that the normally open contacts controlled by control relay 70 of the control circuit for work station 7 are shown closed in FIG. 16, since these normally open contacts would be by-passed and in effect closed in the manner described above with work stations 1 through 6 operative and with work station 7 inoperative, as illustrated in FIGS. 16 and 17.

Thus the respective three position selector switches SS5, SS6, SS7, SS8, SS9, SS10 and SS11 are individually operable to establish a control circuit for automatic operation at a given work station in a first position, to establish a circuit for manual operation of a given work station in a second position, and to establish a by-pass circuit for a given work station in a third position. In addition, the contacts of the respective selector switches are so arranged that establishment of any one of these circuits is accompanied by deenergization of both of the other circuits in order to avoid unexpected and possibly conflicting operation of either of the other circuits.

In addition, the gaging apparatus can be cycled manually without rotating the gage head out of its inoperative position by displacing switches SW3A and SW3B from the positions shown in FIG. 16 so that SW3A is closed to by-pass control relay CR1, dependent for energization upon closing the normally open contacts of limit switch LS1, and so that switch SW3B is opened to by-pass time delay relay TR2. Moreover, the gaging apparatus may be reset without completing the movement of the gage head 41 necessary to engage it with the next successive ground crankpin, by opening reset switch SW4 to deenergize control relay CR2, without opening the normally closed contacts of one of limit switches LS1, LS2, LS3, LS4, LS5 and LS6, or LS7.

Substitution of Standby Station for Another Station

The substitution of work station 7 for any one of work stations 1 through 6 is effected by positioning the selector switch SS5, SS6, SS7, SS8, SS9 or SS10 of the work station to be inactivated in the dotted line position of SS5 illustrated in FIG. 16 and by placing the selector switch SS11 in the control circuit of work station 7 in the solid line position of SS5 shown in FIG. 16. In addition, it is necessary to make several suitable adjustments in the set-up of grinding machine 10′, in work loader mechanism 201′, and in the portion of the conveyor mechanism assembly 20 serving work station 7. First, the indexing finger elements 188 of the crankshaft indexing mechanism 181 shown best in FIGS. 8, 9 and 10 must be properly positioned to rotate the desired crankpin into the appropriate position for grinding at station 7. Second, the crankpin guiding and restraining rollers 126 of the adjustable precise positioning mechanism 121 must be correspondingly positioned according to the scale 136 shown best in FIG. 11 in order to precisely position the workpieces to be ground at work station 7. Third, the adjustably positioned gage head 141 adjoining work station 7 must be properly positioned along the transverse member 146' of the U-shaped gage head supporting frame 145' shown best in FIG. 15. Fourth, the latch mechanism 232 on work loader mechanism 201' must be released by operation of push rod 248, shown best in FIGS. 13 and 14, in order to permit the proper positioning of stop rod positioning lever 221 along scale 229 so that the adjustable carriage stop rod 211, also best shown in FIGS. 13 and 14, is properly positioned transversely of the work loader mechanism 201'. Fifth, the left hand work drive assembly 251 and the right hand work drive assembly 252 must be properly positioned transversely of the grinding machine 10' and the left hand work holder 255 and the right hand work holder 256 must be properly positioned upon the left hand face plate assembly 253 and the right hand face plate assembly 254, respectively, as, for example, according to the teachings of copending application Serial No. 775,007, now Patent No. 2,950,586 or copending application Serial No. 26,536 of Stephen H. Smith, now Patent No. 3,034,268. Then, the apparatus constructed and arranged according to the teachings of the instant invention may be operated to produce crankshafts with all crank pins ground to the desired dimensions by by-passing any one of a series of unitized individual work stations and by substituting a suitably adjusted universal work station.

Conclusion

Thus, the present invention provides an integrated unitary apparatus arranged to receive and handle a large number of similar unfinished workpieces so as to accomplish a requisite series of processing operations thereon in order to deliver a series of fully processed workpieces therefrom.

It is to be understood that the illustrative embodiment of the instant invention described in detail above is exemplary only, and that many variations of the apparatus as described are contemplated within the scope of the instant invention as defined in the several claims appended hereto.

What is claimed is:

1. A unitary conveyor mechanism assembly disposed adjacent to a series of work piece processing machines served thereby comprising a relatively fixed supporting base portion having a substantially flat horizontally disposed elongated upper surface, a reciprocating portion mounted upon and slidably movable relative to the upper surface of said fixed base portion, a plurality of work piece supporting means fixedly secured to said reciprocating portion at predetermined spaced intervals along the length of said reciprocating portion, a first actuating means interconnecting said fixed base portion and said reciprocating portion operable in one direction to advance said reciprocating portion relative to said base portion and operable in the opposite direction to retract said reciprocating portion relative to the base portion, a rotatable portion comprising a plurality of work piece lifting means rotatably supported on a plurality of pivot supporting means fixedly secured to said base portion at spaced intervals along said base portion, a second actuating means interconnecting said rotatable portion and said fixed base portion operable in one direction to displace each work piece lifting means of said rotatable portion angularly about its pivot supporting means to lift a series of work pieces from said work piece supporting means and operable in the opposite direction to displace each work piece lifting means of said rotatable portion angularly about its pivot supporting means to deposit a series of work pieces on said work piece supporting means and control means including operating means sequentially effective to initiate operation of said first actuating means in one direction, operation of said second actuating means in one direction, operation of said first actuating means in the other direction, and operation of said second actuating means in the other direction, whereby a series of work pieces are advanced along said conveyor mechanism assembly from each work piece supporting means to the next work piece supporting means, and, in addition, a plurality of selectively actuated work piece transfer means, each operable to remove a work piece to be processed by a given work piece processing machine from a given work piece supporting means and to deposit a work piece which has been processed by a given work piece processing machine on the same work piece supporting means, said control means including actuating means for operating said work piece transfer means in coordinated relation to operation of said conveyor mechanism assembly whereby work pieces are removed from and deposited upon given work piece supporting means between successive operating cycles of said conveyor mechanism assembly.

2. A device as described in claim 1 wherein said plurality of work piece supporting means includes work piece supporting means adjacent to the respective work piece transfer means of different predetermined vertical dimensions arranged to support respective work pieces at different elevations relative to the upper surface of said fixed supporting base portion and said plurality of work piece lifting means includes work piece lifting means of different predetermined radial dimensions relative to said pivot supporting means positioned in cooperative relation to said different work piece supporting means arranged to lift respective work pieces to different elevations relative to said upper surface, whereby a series of work pieces may be transferred through and supported in different predetermined vertical locations relative to said fixed supporting base portion.

3. A device as claimed in claim 1 wherein said work piece supporting means located within a series of sections of said reciprocating portion serving a corresponding series of work piece transfer means are arranged to receive work pieces in a predetermined angular orientation and include means positioned to maintain said work pieces substantially in said predetermined angular orientation, and said work piece supporting means located within an additional section of said reciprocating portion serving an additional work piece transfer means are arranged to receive work pieces in any angular orientation and include means positioned to support the work pieces for rotation into any desired angular orientation.

4. A device as described in claim 3, and, in addition, a work piece indexing means mounted upon said conveyor mechanism assembly adjacent to said additional segment and including a plurality of indexing elements individually movable between a first operative position and a second inoperative position selectively positioned to index each of a series of work pieces into one of several predetermined angular orientations.

5. A device as described in claim 4 wherein said plurality of work piece supporting means includes work piece supporting means of different predetermined vertical dimensions arranged to support respective work pieces at different elevations relative to the upper surface of said fixed supporting base portion and said plurality of work piece lifting means includes work piece lifting means of different predetermined radial dimensions relative to said pivot supporting means arranged to lift respective work pieces to different elevations relative to said upper surface, whereby a series of work pieces may be transferred through and supported in different predetermined locations vertically relative to said fixed supporting base portion.

6. A device as described in claim 4, and, in addition, in said series of segments precise positioning means disposed in operative relation to selected work piece supporting means adjacent to a series of said work piece transfer means for precisely positioning the work pieces in said predetermined angular position on said work piece supporting means, and on said additional segment adjustable precise positioning means disposed in operative relation to a selected work piece supporting means adjacent to an additional said work piece transfer means selectively positioned in one of a plurality of predetermined locations to precisely position a work piece deposited thereon in one of several predetermined angular positions.

7. A device as described in claim 3, and, in addition, a plurality of selectively actuated independently operable unitized work piece processing machines, each disposed and arranged to process a single predetermined discrete different portion of each of a series of similar work pieces, and an additional selectively actuated independently operable universal work piece processing machine adjustable to process any one of the several predetermined different portions of a series of similar work pieces, whereby said universal work piece processing machine may be adjusted to be substituted for any one of said unitized work piece processing machines.

8. A unitary conveyor mechanism assembly disposed adjacent to a series of machine tools served thereby comprising a relatively fixed supporting base portion having a substantially flat horizontally disposed elongated upper surface, a reciprocating portion mounted upon and slidably movable relative to the upper surface of said fixed base portion, a plurality of work piece supporting means fixedly secured to said reciprocating portion at predetermined spaced intervals along the length of said reciprocating portion, said work supporting means located within a series of sections of said reciprocating portion serving a corresponding series of work piece transfer means being arranged to receive work pieces in a predetermined angular orientation and including means effective to maintain said work pieces substantially in said predetermined angular orientation, and said work piece supporting means located within an additional section of said reciprocating portion serving an additional work piece transfer means being arranged to receive work pieces in any angular orientation and including means effective to support the work pieces for rotation into any desired angular orientation, a first actuating means interconnecting said fixed base portion and said reciprocating portion operable in one direction to advance said reciprocating portion relative to said base portion and operable in the opposite direction to retract said reciprocating portion relative to the base portion, a rotatable portion including a plurality of work piece lifting means rotatably supported on a plurality of pivot supporting means fixedly secured to said base portion at spaced intervals along said base portion and a second actuating means interconnecting said rotatable portion and said fixed base portion operable in one direction to displace said rotatable portion to lift a series of work pieces from said work piece supporting means and operable in the opposite direction to displace said rotatable portion to deposit a series of work pieces on said work piece supporting means, first positioning means disposed in operative relation to selected work piece supporting means within said series of sections for axially positioning work pieces thereon, second positioning means disposed in operative relation to the same selected work piece supporting means for precisely positioning the work pieces in a predetermined angular position on said work piece supporting means, third positioning means disposed in operative relation to another selected work piece supporting means within said additional section for axially positioning the work piece thereon, and adjustable fourth positioning means selectively positioned in one of a plurality of predetermined locations adjoining said other selected work piece supporting means to precisely position a work piece deposited thereon in one of several predetermined angular positions, a work piece indexing means mounted upon said conveyor mechanism assembly adjacent said additional section of said reciprocating portion and including a plurality of indexing elements movable between a first operative position and a second inoperative position selectively operable to index each of a series of work pieces into one of several predetermined angular orientations before they reach said other selected work piece supporting means, and control means for said conveyor mechanism assembly including operating means sequentially effective to initiate operation of said first actuating means in one direction, operation of said second actuating means in one direction, operation of said first actuating means in the opposite direction, and operation of said second actuating means in the opposite direction, whereby a series of work pieces are advanced along said conveyor mechanism assembly from each work piece supporting means to the next work piece supporting means.

9. A device as described in claim 8, and, in addition a plurality of selectively actuated work piece transfer means, each operable to remove a work piece to be processed from a given selected work piece supporting means within said series of sections and to deposit a work piece which has been processed on the same work piece supporting means, and an additional selectively actuated work piece transfer means operable to remove a work piece to be processed from a selected work piece supporting means within said additional section and to deposit a work piece which has been processed on the same work piece supporting means, said control means including a plurality of third actuating means for operating said work piece transfer means in coordinated relation to operation of said conveyor mechanism assembly, whereby work pieces are removed from and deposited upon given work piece supporting means between successive operating cycles of said conveyor mechanism assembly, a plurality of selectively actuated independently operable unitized machine tools, each disposed and arranged to process a single predetermined discrete different portion of each of a series of similar work pieces, and an additional selectively actuated independently operable universal machine tool adjustable to process any one of the several predetermined different portions of a series of similar work pieces, whereby said universal machine tool may be substituted for any one of said unitized machine tools, and a plurality of selectively operable by-pass means operatively connected with the respective third actuating means associated with each of said plurality of work piece transfer mechanisms operable to by-pass said third actuating means, whereby said conveyor mechanism assembly is maintained operable in response to said control means when at least one of said plurality of work piece transfer means associated therewith is inactivated.

10. A conveyor mechanism assembly comprising an elongated relatively fixed supporting base portion having a substantially flat horizontally disposed upper surface, an elongated reciprocating portion mounted upon and slidably movable relative to the upper surface of said fixed base portion, a plurality of work piece supporting means fixedly secured to said reciprocating portion at predetermined spaced intervals therealong and arranged to support elongated work pieces with their respective axes substantially horizontal and disposed transversely of said reciprocating portion, said plurality of work piece supporting means including work piece supporting means of different predetermined vertical dimensions arranged to support respective work pieces at different elevations relative to the upper surface of said fixed supporting base portion, a first actuating means interconnecting said fixed base portion and said reciprocating portion operable in one direction to advance said reciprocating portion relative to said base portion and operable in the opposite direction to retract said reciprocating portion relative to the base portion, a rotatable portion including a plurality of work piece lifting means rotatably supported on a plurality of pivot supporting means fixedly secured to said base portion at spaced intervals along said base portion, said plurality of work piece lifting means including work piece lifting means of different predetermined radial dimensions relative to said pivot supporting means arranged to lift respective work pieces to different elevations relative to said upper surface by concurrent movement through a predetermined angular distance, a second actuating means interconnecting said rotatable portion and said fixed base portion operable in one direction to displace the respective work piece lifting means of said rotatable portion angularly about spaced parallel horizontal axes to lift a series of work pieces from said work piece supporting means and operable in the opposite direction to displace the respective work piece lifting means of said rotatable portion angularly about spaced parallel horizontal axes to deposit a series of work pieces on said work piece supporting means and control means including operating means sequentially effective to initiate operation of said first actuating means in one direction, operation of said second actuating means in one direction, operation of said first actuating means in the opposite direction, and operation of said second actuating means in the opposite direction, whereby a series of work pieces are advanced along said conveyor mechanism assembly from each work piece supporting means to the next work piece supporting means so that successive work pieces may be transferred through and supported in different predetermined vertical locations relative to said fixed supporting base portion.

11. A device as described in claim 10, and, in addition, means disposed in operative relation to selected work piece supporting means for axially positioning work pieces thereon and means disposed in operative relation to the same selected work piece supporting means for precisely positioning the work pieces in the predetermined angular position on said work piece supporting means.

12. A conveyor mechanism assembly comprising an elongated relatively fixed supporting base portion having a substantially flat horizontally disposed upper surface, an elongated reciprocating portion mounted upon and slidably movable relative to the upper surface of said fixed base portion, said reciprocating portion including longitudinally arrayed and fixedly interconnected first and second sections, a plurality of work piece supporting means fixedly secured to said reciprocating portion at predetermined spaced intervals along the first and second sections thereof and arranged to support elongated work pieces with their respective axes substantially horizontal and disposed transversely of said reciprocating portion, said work piece supporting means mounted upon the first section of said reciprocating portion being arranged to receive work pieces in a given predetermined angular orientation and including means effective to maintain the work pieces substantially in said predetermined angular orientation and said work piece supporting means mounted upon the second section of said reciprocating portion being arranged to receive work pieces in any angular orientation and including means effective to support the work pieces for rotation into any desired angular orientation, a first actuating means interconnecting said fixed base portion and said reciprocating portion operable in one direction to advance said reciprocating portion relative to said base portion and operable in the opposite direction to retract said reciprocating portion relative to the base portion, a rotatable portion including a plurality of work piece lifting means rotatably supported on a plurality of pivot supporting means fixedly secured to said base portion at spaced intervals along said base portion and a second actuating means interconnecting said rotatable portion and said fixed base portion operable in one direction to displace the respective work piece lifting means of said rotatable portion angularly about spaced parallel horizontal axes to lift a series of work pieces from said work piece supporting means and operable in the opposite direction to displace the respective work piece lifting means of said rotatable portion angularly about spaced parallel horizontal axes to deposit a series of work pieces on said work piece supporting means and control means including operating means sequentially effective to initiate operation of said first actuating means in one direction, operation of said second actuating means in one direction, operation of said first actuating means in the opposite direction, and operation of said second actuating means in the opposite direction, whereby a series of work pieces are advanced along said conveyor mechanism assembly from each work piece supporting means to the next work piece supporting means.

13. A device as described in claim 12, and in addition, on the first section of said reciprocating portion, means disposed in operative relation to selected work piece supporting means for axially positioning work pieces thereon and means disposed in operative relation to the same selected work piece supporting means for precisely positioning the work pieces in a predetermined angular position on said work piece supporting means, and on the second section of said reciprocating portion, positioning means disposed in operative relation to a selected work piece supporting means for axially positioning the work piece thereon and adjustable precise positioning means selectively positioned in one of a plurality of predetermined locations adjoining said selected work piece supporting means to precisely position a work piece deposited thereon in one of several predetermined angular positions.

14. A conveyor mechanism assembly comprising a relatively fixed supporting base portion including bearing means defining a substantially flat horizontally disposed elongated upper surface, a horizontally disposed reciprocating portion mounted upon and slidably movable relative to the bearing means defining the upper surface of said fixed base portion, a plurality of work piece supporting means fixedly secured to said reciprocating portion at predetermined spaced intervals along the length of said reciprocating portion, said plurality of work piece supporting means including work piece supporting means of different predetermined vertical dimensions arranged to support respective work pieces at different vertical distances above said reciprocating portion, a first actuating means interconnecting said fixed base portion and said reciprocating portion operable in one direction to advance said reciprocating portion relative to said base portion and operable in the opposite direction to retract said reciprocating portion relative to the base portion, a plurality of pivot supporting means fixedly secured to said base portion at spaced intervals along said base portion, a rotatable portion including a corresponding plurality of work piece lifting means rotatably supported on said pivot supporting means for rotation about parallel horizontal axes and connecting means interconnecting said plurality of work piece lifting means for rotary movement in unison through a given angular displacement, said plurality of work piece lifting means including work piece lifting means of different predetermined radial dimensions relative to said pivot supporting means arranged to lift respective work pieces to different elevations relative to said reciprocating portion by said simultaneous movement through a given angular displacement, the different radial dimensions of the respective lifting means being directly proportional to the different vertical dimensions of the respective work piece supporting means with which they cooperate, a second actuating means interconnecting said connecting means and said fixed base portion operable in one direction to displace said plurality of work piece lifting means simultaneously to lift a series of work pieces from said work piece supporting means and operable in the opposite direction to displace said plurality of work piece lifting means simultaneously to deposit a series of work pieces on said work piece supporting means and control means including operating means sequentially effective to initiate operation of said first actuating means in one direction, operation of said second actuating means in one direction, operation of said first actuating means in the opposite direction, and operation of said second actuating means in the opposite direction, whereby a series of work pieces are advanced along said conveyor mechanism assembly from each work piece supporting means to the next work piece supporting means so that successive work pieces may be transferred through and supported in different predetermined locations vertically relative to said reciprocating portion.

15. A device as claimed in claim 14 wherein said work supporting means over a first section of said reciprocating portion are arranged to receive elongated work pieces in a predetermined angular orientation and includes means effective to maintain said work pieces substantially in said predetermined angular orientation, and said work piece supporting means over a second section of said reciprocating portion are arranged to receive elongated work pieces in any angular orientation and include means effective to support the work pieces for rotation into any desired angular orientation.

16. A device as described in claim 15, and, in addition, a work piece indexing means mounted upon said conveyor mechanism assembly adjacent to said second section of said reciprocating portion and including a plurality of indexing elements movable between a first operative position and a second inoperative position selectively operable to index each of a series of elongated work pieces supported on said second section into one of several predetermined angular orientations as they successively approach a selected work piece supporting means.

17. A device as described in claim 16, and, in addition on said first section positioning means disposed in operative relation to selected work piece supporting means for axially positioning elongated work pieces thereon and means disposed in operative relation to the same selected work piece supporting means for precisely positioning said elongated work pieces in a predetermined angular position on said work piece supporting means, and on said second section, positioning means disposed in operative relation to a selected work piece supporting means for axially positioning an elongated work piece thereon and adjustable precise positioning means selectively positioned in one of a plurality of predetermined locations adjoining said selected work piece supporting means to precisely position an elongated work piece deposited thereon in the one of several predetermined angular positions for which said indexing means is set.

18. In combination with a unitary conveyor mechanism assembly arranged and cyclically operable to deliver a series of similar elongated work pieces in a substantially fixed predetermined orientation successively to a spaced plurality of work piece supporting means for transfer to selected units of a plurality of work piece transfer means for delivery to selected units of a plurality of unitized machine tools each arranged to process a different predetermined portion of a work piece and return to said conveyor mechanism assembly, a supplemental section of said conveyor mechanism assembly provided with a spaced plurality of work piece supporting means arranged to support a series of work pieces for rotation into any one of several predetermined angular orientations and an adjustable work piece indexing means operatively associated with said supplemental section of said conveyor mechanism assembly arranged to rotate successive work pieces into a selected one of several predetermined orientations as the respective work pieces are transferred to successive work piece supporting means, a universal machine tool including work piece supporting means adjustable to any one of several predetermined positions to support a work piece for processing any one of several predetermined portions therof on said universal machine tool, and adjustable work piece transfer means including adjustable positioning means selectively operable to modify the operating cycle of said adjustable work piece transfer means to correspond to the selected position of the work piece supporting means of said universal machine tool, whereby said universal machine tool may be substituted for any one of a plurality of unitized machine tools also supplied by said unitary conveyor mechanism assembly.

19. A device as described in claim 18, and, in addition, on said supplemental section of said conveyor mechanism assembly positioning means disposed in operative relation to a selected work piece supporting means for longitudinally positioning each elongated work piece thereon and adjustable precise positioning means selectively positioned in one of a plurality of predetermined locations adjoining said selected work piece supporting means to precisely position each elongated work piece deposited thereon in the selected one of several predetermined angular positions.

20. A device as described in claim 19, and, in addition, a plurality of work piece gaging means mounted upon said conveyor mechanism assembly adjacent to selected work piece supporting means for movement between a first inoperative position out of engagement with a work piece and a second operative position in engagement with the work piece, actuating means for said gaging means operable in one direction to move each said gaging means into engagement with a work piece and operable in the opposite direction to move each said gaging means out of engagement with a work piece, and a gage element incorporated in each said gaging means for sensing the condition of the portion of a work piece engaged by each said gaging means, and control circuits actuated by the respective gage elements selectively operable collectively to initiate a cycle of operation of said conveyor mechanism assembly if the respective gage elements indicate all of the work pieces gaged thereby have been properly processed or individually to preclude another cycle of operation of the conveyor mechanism assembly if any one of the gage elements indicates a work piece has not been properly processed.

21. A control system for a unitary cyclically operable conveyor mechanism assembly arranged to transfer a series of spaced intermediate stations to an output station for delivery of work pieces to and removal of work pieces from selected stations serving a plurality of work piece transfer means, comprising first sensing means operable in response to the presence of a work piece at the input station, second sensing means operable in response to the absence of a work piece from said output station, operation of said first sensing means and said second sensing means collectively effecting the establishment of a circuit required for the operation of said control system for a conveyor mechanism assembly, a plurality of third sensing means respectively operable in response to the deposit of work pieces at the respective selected stations by respective work piece transfer means, a plurality of gaging means each operable in response to the operation of one of the plurality of said third sensing means to check a work piece deposited at a selected station, a first control means responsive to predetermine signals from all of said gaging means for readying a conveyor mechanism assembly for a cycle of operation, a second control means operable after said first control means has operated to initiate and terminate a cycle of operation of a conveyor mechanism assembly, and a plurality of selectively operable by-pass means operatively connected with the respective portions of said control system associated with each of a plurality of work piece transfer mechanisms individually operable to by-pass said third sensing means associated with the respective selected stations of said conveyor mechanism assembly and thereby to by-pass said gaging means, whereby said conveyor mechanism assembly may be maintained operable when at least one of a plurality of work piece transfer means associated therewith is inactivated.

22. A device as described in claim 21, and, in addition, a plurality of fourth sensing means respectively disposed adjacent to said selected stations respectively operable in response to the absence of a work piece at each of the respective selected stations to preclude subsequent operation of respective work piece transfer means, and a plurality of triggering means respectively connected in series with said plurality of fourth sensing means all responsive to completion of an operating cycle of a conveyor mechanism assembly and independently operable if the fourth sensing means associated therewith is rendered inoperative by the presence of a work piece to initiate a subsequent cycle of operation of each of a plurality of work piece transfer means operatively associated with a conveyor mechanism assembly.

23. A control system for a cyclically operable unitary conveyor mechanism assembly arranged to transfer a series of similar work pieces from an input station through a series of spaced intermediate stations to an output station for delivery of work pieces to and removal of work pieces from selected stations serving selected units of a plurality of work piece transfer means, comprising a plurality of first sensing means respectively operable in response to the deposit of work pieces at the respective selected stations by each of a plurality of work piece transfer means, a plurality of gaging means each operable in response to operation of one of said first sensing means to check a work piece deposited at a selected station by one of a plurality of work piece transfer means, a first control means responsive to predetermined signals from all of said gaging means for readying a conveyor mechanism assembly for a cycle of operation, a second control means operable after said first control means has operated to initiate and terminate a cycle of operation of a conveyor mechanism assembly, a plurality of second sensing means respectively disposed adjacent to said selected stations operable in response to the absence of a work piece at each of the respective selected stations serving a plurality of work piece transfer means to preclude subsequent operation of the work piece transfer means served thereby, and a plurality of selectively operable by-pass means operatively connected with the respective portions of said control system associated with each of a plurality of work piece transfer mechanism operable to by-pass said first sensing means associated with the respective selected stations of a conveyor mechanism assembly, and thereby the gaging means responsive thereto, whereby a conveyor mechanism assembly responsive to said control system may be maintained operable when at least one of a plurality of work piece transfer means associated therewith is inactivated.

24. A unitary conveyor mechanism assembly having an input station, a plurality of spaced intermediate stations, and an output station, said conveyor mechanism assembly being arranged and cyclically operable to deliver a series of similar work pieces successively to selected stations for transfer to one of a plurality of work piece transfer means for delivery to one of a plurality of machine tools and return to the same selected stations of said conveyor mechanism assembly, said conveyor mechanism assembly including a plurality of coacting work piece supporting and displacing means collectively operable to complete a cycle of operation of said conveyor mechanism assembly and a plurality of coordinated actuating means arranged to operate said work piece supporting and displacing means, and a control system for said conveyor mechanism assembly comprising first sensing means operable in response to the presence of a work piece at the input station, second sensing means operable in response to the absence of a work piece from said output station, operation of said first sensing means and said second sensing means collectively effecting the establishment of a circuit required for the operation of said control system for said conveyor mechanism assembly, a plurality of third sensing means respectively operable in response to the deposit of work pieces at the respective selected stations by respective work piece transfer means, a plurality of gaging means each operable in response to the operation of one of the plurality of said third sensing means to check a work piece deposited at a selected station, first control means responsive to predetermined signals from all of said gaging means for readying said conveyor mechanism assembly for a cycle of operation, second control means operable to initiate and terminate the operation of said coordinated actuating means, and a plurality of selectively operable by-pass means operatively connected with the respective portions of said control system associated with each of a plurality of work piece transfer mechanisms individually operable to by-pass said third sensing means associated with the respective selected stations of said conveyor mechanism assembly and thereby to by-pass said gaging means, whereby said conveyor mechanism assembly may be maintained operable when at least one of a plurality of work piece transfer means associated therewith is inactivated.

25. A unitary cyclically operable conveyor mechanism assembly arranged and operable to deliver a series of similar work pieces to a spaced plurality of work piece supporting means thereon and thence to selected ones of said work piece supporting means for transfer to a plurality of work piece transfer means for delivery to a plurality of machine tools and return to the same selected work piece supporting means on said conveyor mechanism assembly, and a control system for said conveyor mechanism assembly including a plurality of work piece gaging means mounted upon said conveyor mechanism assembly adjacent to said selected work piece supporting means for movement between a first inoperative position out of engagement with a work piece and a second operative position in engagement with a work piece supported upon one of said selected work piece supporting means, actuating means for said gaging means operable in one direction to move each said gaging means into engagement with a work piece and operable in the opposite direction to move each said gaging means out of engagement with a work piece, a gage element incorporated in each said gaging means for sensing the condition of the portion of a work piece engaged by each said gaging means, control circuits actuated by the respective gage elements selectively operable collectively to initiate a cycle of operation of said conveyor mechanism assembly if the respective gage elements indicate all of the work pieces gaged thereby are properly processed and individually to preclude another cycle of operation of the conveyor mechanism assembly if any one of the gage elements indicates a work piece is not properly processed, and a plurality of selectively operable bypass means operatively connected with the respective portions of said control system associated with each of a plurality of work piece transfer mechanisms individually operable to by-pass the respective gaging means and the actuating means therefor, whereby said conveyor mechanism assembly may be maintained operable when at least one of a plurality of work piece transfer means associated therewith is inactivated.

26. A unitary conveyor mechanism assembly having a plurality of spaced work piece supporting stations, said conveyor mechanism assembly being arranged and cyclically operable to deliver a series of similar work pieces successively to successive stations and thence to selected work piece supporting stations for transfer to one of a plurality of work piece transfer means for delivery to one of a plurality of machine tools and return to the same selected stations of said conveyor mechanism assembly, and a control system for said conveyor mechanism assembly including a plurality of work piece gaging means respectively mounted upon said conveyor mechanism assembly adjacent to one of said selected work piece supporting stations for movement between a first inoperative position out of engagement with a work piece and a second operative position in engagement with a work piece supported upon the associated work piece supporting station, a plurality of gage elements each incorporated in one of said gaging means and each arranged when the gaging means on which it is supported is in its operative position automatically to sense the condition of the portion of a work piece engaged by the gaging element, a first plurality of control means collectively operable to prepare said conveyor mechanism assembly for a cycle of operation if the respective gage elements indicate all of the work pieces gaged thereby are properly processed, a second plurality of control means individually operable to preclude another cycle of operation of the conveyor mechanism assembly if any one of the gage elements indicates a work piece is not properly processed, actuating means for said gaging means automatically operable in one direction to move each said gaging means into engagement with a work piece and automatically operable in the opposite direction when a gaging operation is completed to move each said gaging means out of engagement with a work piece, a plurality of sensing means respectively operable in response to the deposit of a work piece at each selected station to initiate the operation of the actuating means for the gaging means mounted adjacent to that station, a third plurality of control means operable to initiate a cycle of operation of the conveyor mechanism assembly when all of said gaging means have been returned to their inoperative positions by the respective actuating means only if the conveyor mechanism assembly has been prepared for a cycle of operation, and a plurality of selectively operable by-pass means operatively connected with the respective portions of said control system coupled to each of the plurality of work piece transfer mechanisms associated with said conveyor mechanism assembly, each by-pass means being operable to by-pass one of said sensing means, whereby said conveyor mechanism assembly may be maintained operable when at least one of a plurality of work piece transfer means associated therewith is inactivated.

27. A conveyor mechanism assembly comprising an elongated fixed supporting base portion having an elongated supporting surface, an elongated reciprocating portion mounted upon and slidably movable lengthwise relative to the supporting surface of said fixed base portion, a plurality of spaced work piece supporting means fixedly secured to said reciprocating portion along its length, a first actuating means interconnecting said fixed base portion and said reciprocating portion operable in one direction to advance said reciprocating portion relative to said base portion and operable in the opposite direction to retract said reciprocating portion relative to the base portion, a plurality of pivot supporting means spaced lengthwise of and fixedly secured to said base portion, a rotatable portion comprising a plurality of work piece engaging and lifting means rotatably supported on said plurality of spaced pivot supporting means for rotation individually about spaced parallel horizontal axes extending transversely of said base portion and intersecting said reciprocating portion, a second actuating means interconnecting the respective work piece engaging and lifting means of said rotatable portion and said fixed base portion operable in one direction to rotate each work piece engaging and lifting means of said rotatable portion through a predetermined acute angle sufficient first to engage a series of work pieces and then to disengage a series of work pieces from said work piece supporting means and operable in the opposite direction to rotate each work piece engaging and lifting means of said rotatable portion through the same acute angle first to deposit a series of work pieces on said work piece supporting means and then to disengage said work piece engaging and lifting means from a series of work pieces, and control means including operating means sequentially effective to initiate operation of said first actuating means in one direction, operation of said second actuating means in one direction, operation of said first actuating means in the opposite direction, and operation of said second actuating means in the opposite direction, whereby a series of work pieces are advanced along said conveyor mechanism assembly from each work piece supporting means to the next work piece supporting means.

28. A conveyor mechanism assembly comprising an elongated fixed supporting base portion having an elongated supporting surface, an elongated reciprocating portion mounted upon and slidably movable relative to the supporting surface of said fixed base portion, a plurality of spaced work piece supporting means fixedly secured to said reciprocating portion along its length, a first actuating means interconnecting said fixed base portion and said reciprocating portion operable in one direction to advance said reciprocating portion relative to said base portion and operable in the opposite direction to retract said reciprocating portion relative to the base portion, a rotatable portion comprising a plurality of work piece engaging and lifting means rotatably supported on a plurality of spaced pivot supporting means fixedly secured to said base portion, a second actuating means interconnecting said rotatable portion and said fixed base portion operable in one direction to rotate each work piece engaging and lifting means of said rotatable portion to disengage a series of work pieces from said work piece supporting means and operable in the opposite direction to rotate each work piece engaging and lifting means of said rotatable portion to deposit a series of work pieces on said work piece supporting means, wherein said plurality of work piece supporting means includes work piece supporting means of different predetermined vertical dimensions arranged to support respective work pieces at different elevations relative to the upper surface of said fixed supporting base portion and said plurality of work piece engaging and lifting means includes work piece engaging and lifting means of different predetermined radial dimensions relative to said pivot supporting means arranged to lift respective work pieces to different elevations relative to said upper surface, whereby a series of work pieces may be transferred through and supported in different predetermined vertical locations relative to said fixed supporting base portions, and control means including operating means sequentially effective to initiate operation of said first actuating means in one direction, operation of said second actuating means in one direction, operation of said first actuating means in the opposite direction, and operation of said second actuating means in the opposite direction, whereby a series of work pieces are advanced along said conveyor mechanism assembly from each work piece supporting means to the next work piece supporting means.

29. A conveyor mechanism assembly comprising an elongated fixed supporting base portion having an elongated supporting surface, an elongated reciprocating portion mounted upon and slidably movable relative to the supporting surface of said fixed base portion, a plurality of spaced work piece supporting means fixedly secured to said reciprocating portion along its length, a first actuating means interconnecting said fixed base portion and said reciprocating portion operable in one direction to advance said reciprocating portion relative to said base portion and operable in the opposite direction to retract said reciprocating portion relative to the base portion, a rotatable portion comprising a plurality of work piece engaging and lifting means rotatably supported on a plurality of spaced pivot supporting means fixedly secured to said base portion, a second actuating means interconnecting said rotatable portion and said fixed base portion operable in one direction to rotate each work piece engaging and lifting means of said rotatable portion to disengage a series of work pieces from said work piece supporting means and operable in the opposite direction to rotate each work piece engaging and lifting means of said rotatable portion to deposit a series of work pieces on said work piece supporting means, and control means including operating means sequentially effective to initiate operation of said first actuating means in one direction, operation of said second actuating means in one direction, operation of said first actuating means in the opposite direction and operation of said second actuating means in the opposite direction, whereby a series of work pieces are advanced along said conveyor mechanism assembly from each work piece supporting means to the next work piece supporting means, and, in addition, a plurality of selectively actuated work piece transfer means, each operable to remove a work piece to be processed from a given work piece supporting means and to deposit a work piece which has been processed on the same work piece supporting means, said control means including actuating means for operating said work piece transfer means in coordinated relation to operation of said conveyor mechanism assembly, whereby work pieces are removed from and deposited upon given work piece supporting means between successive operating cycles of said conveyor mechanism assembly.

30. A unitary conveyor mechanism assembly disposed adjacent to a series of work piece transfer mechanisms selectively operable with a series of selectively operable work piece processing machines served thereby, said conveyor mechanism comprising a relatively fixed supporting base portion having a substantially flat horizontally disposed elongated upper surface, an elongated reciprocating portion mounted upon and slidably movable lengthwise relative to the upper surface of said fixed base portion, a plurality of work piece supporting means fixedly secured to said reciprocating portion at predetermined spaced intervals along the length of said reciprocating portion arranged to support a multiplicity of work pieces for movement lengthwise of said conveyor mechanism through a spaced series of transfer stations accommodating adjoining transfer mechanisms, a first actuating means interconnecting said fixed base portion and said reciprocating portion operable in one direction to advance said reciprocating portion relative to said base portion and operable in the opposite direction to retract said reciprocating portion relative to the base portion, a plurality of pivot supporting means at predetermined spaced intervals lengthwise of and fixedly secured to said base portion, a rotatable portion comprising a plurality of work piece engaging and lifting means rotatably supported on said plurality of pivot supporting means for rotation individually about spaced parallel horizontal axes extending transversely of said base portion and intersecting said reciprocating portion, each work piece engaging and lifting means including radially elongated work piece engaging elements rotatable out of and back to at rest positions alongside said reciprocating portion, a second actuating means interconnecting the respective work piece engaging and lifting means of said rotatable portion and said fixed base portion operable in one direction to displace said work piece engaging and lifting means of said rotatable portion angularly about its pivot supporting means to lift a series of work pieces from said work piece engaging and supporting means and operable in the opposite direction to displace each work piece engaging and lifting means of said rotatable portion angularly about its pivot supporting means to deposit a series of work pieces on said work piece supporting means and control means including operating means sequentially effective to initiate operation of said first actuating means in one direction, operation of said second actuating means in one direction, operation of said first actuating means in the other direction, and operation of said second actuating means in the other direction, whereby a series of work pieces are advanced along said conveyor mechanism assembly from each work piece supporting means to the next work piece supporting means through successive transfer stations and thence selectively to and from selected work piece processing machines.

31. A unitary conveyor mechanism assembly disposed adjacent to a series of work piece processing machines served thereby comprising a relatively fixed supporting base portion having a substantially flat horizontally disposed elongated upper surface, a reciprocating portion mounted upon and slidably movable relative to the upper surface of said fixed base portion, a plurality of work piece supporting means fixedly secured to said reciprocating portion at predetermined spaced intervals along the length of said reciprocating portion, said work piece supporting means mounted upon a first section of said reciprocating portion being arranged to receive work pieces in a predetermined angular orientation and including means positioned to maintain the work pieces substantially in said predetermined angular orientation, and said work piece supporting means mounted upon a second section of said reciprocating portion being arranged to receive work pieces in any angular orientation and including means positioned to support the work pieces for rotation into any desired angular orientation, a work piece indexing means mounted upon said conveyor mechanism assembly adjacent to the second section of said reciprocating portion and including a plurality of indexing elements movable between a first operative position and a second inoperative position selectively operable to index each of a series of work pieces into one of several predetermined angular orientations as they are advanced along the second section of said reciprocating portion of said conveyor mechanism assembly, a first actuating means interconnecting said fixed base portion and said reciprocating portion operable in one direction to advance said reciprocating portion relative to said base portion and operable in the opposite direction to retract said reciprocating portion relative to the base portion, a rotatable portion comprising a plurality of work piece lifting means rotatably supported on a plurality of pivot supporting means fixedly secured to said base portion at spaced intervals along said base portion, a second actuating means interconnecting said rotatable portion and said fixed base portion operable in one direction to displace each work piece lifting means of said rotatable portion angularly about its pivot supporting means to lift a series of work pieces from said work piece supporting means and operable in the opposite direction to displace each work piece lifting means of said rotatable portion angularly about its pivot supporting means to deposit a series of work pieces on said work piece supporting means and control means including operating means sequentially effective to initiate operation of said first actuating means in one direction, operation of said second actuating means in one direction, operation of said first actuating means in the other direction, and operation of said second actuating means in the other direction, whereby a series of work pieces are advanced along said conveyor mechanism assembly from each work piece supporting means to the next work piece supporting means, and, in addition, a plurality of selectively actuated work piece transfer means, each operable to remove a work piece to be processed from a given work piece supporting means and to deposit a work piece which has been processed on the same work piece supporting means, said control means including actuating means for operating said work piece transfer means in coordinated relation to operation of said conveyor mechanism assembly whereby work pieces are removed from and deposited upon given work piece supporting means between successive operating cycles of said conveyor mechanism assembly, and a predetermined number of selectively actuated independently operable unitized machine tools served by a corresponding number of said work piece transfer means, each disposed and arranged to process a single predetermined discrete different portion of each of a series of similar work pieces, and an additional selectively actuated independently operable universal machine tool adjustable to process any one of the several predetermined different portions of a series of similar work pieces served by an additional said work piece transfer means, whereby said universal machine tool may be substituted for any one of said unitized machines tools.

32. A conveyor mechanism assembly comprising an elongated relatively fixed supporting base portion having a substantially flat horizontally disposed upper surface, a flat elongated reciprocating portion mounted upon and slidably movable lengthwise relative to the upper surface of said fixed base portion, a plurality of work piece supporting means fixedly secured to said reciprocating portion at predetermined spaced intervals therealong and arranged to support elongated work pieces with their respective longitudinal axes substantially horizontal and disposed transversely of said reciprocating portion, a first actuating means interconnecting said fixed base portion and said reciprocating portion operable in one direction to advance said reciprocating portion relative to said base portion and operable in the opposite direction to retract said reciprocating portion relative to the base portion, a plurality of pivot supporting means fixedly secured to said base portion at spaced intervals along said base portion, a rotatable portion including a plurality of work piece engaging and lifting means rotatably supported on said plurality of pivot supporting means for rotation pivotally about spaced parallel horizontal axes extending transversely of said base portion and intersecting said flat reciprocating portion, each work piece engaging and lifting means including a pair of transversely spaced radially elongated arms each provided adjacent its outer end with work piece engaging surfaces and rotatable away from and back to a substantially horizontal at rest position alongside said reciprocating portion, a second actuating means interconnecting said rotatable portion and said fixed base portion operable in one direction to displace the respective work piece engaging and lifting means of said rotatable portion angularly about said spaced parallel horizontal axes through a predetermined acute angle to engage and then lift a series of work pieces from said work piece supporting means and operable in the opposite direction to displace the respective work piece engaging and lifting means of said rotatable portion angularly about said spaced parallel horizontal axes through the same predetermined acute angle to deposit a series of work pieces on said work piece supporting means and then be disengaged from a series of work pieces, and control means including operating means sequentially effective to initiate operation of said first actuating means in one direction, operation of said second actuating means in one direction, operation of said first actuating means in the opposite direction, and operation of said second actuating means in the opposite direction, whereby a series of work pieces are advanced along said conveyor mechanism assembly from each work piece supporting means to the next work piece supporting means.

33. A conveyor mechanism assembly comprising a relatively fixed supporting base portion including bearing means defining a substantially flat horizontally disposed elongated upper surface, a flat horizontally disposed reciprocating portion mounted upon and slidably movable lengthwise relative to the bearing means defining the upper surface of said fixed base portion, a plurality of work piece supporting means fixedly secured to said reciprocating portion at predetermined spaced intervals along the length of said reciprocating portion, a first actuating means interconnecting said fixed base portion and said reciprocating portion operable in one direction to advance said reciprocating portion relative to said base portion and operable in the opposite direction to retract said reciprocating portion relative to the base portion, a plurality of pivot supporting means fixedly secured to said base portion at spaced intervals along said base portion, a rotatable portion including a corresponding plurality of work piece engaging and lifting means rotatably supported on said pivot supporting means for individual rotation about parallel horizontal axis extending transversely of and intersecting said flat reciprocating portion and connecting means interconnecting said plurality of work piece engaging and lifting means for rotary movement in unison through a predetermined acute angle, a second actuating means interconnecting said connecting means and said fixed base portion operable in one direction to effect angular displacement of said plurality of work piece engaging and lifting means simultaneously first to engage and then to lift a series of work pieces from said work piece supporting means and operable in the opposite direction to effect angular displacement of said plurality of work piece engaging and lifting means simultaneously first to deposit a series of work pieces on said work piece supporting means and then to move out of engagement with a series of work pieces, the respective work piece engaging and lifting means each comprising a bell crank pivotally connected intermediate its ends to one of said pivot supporting means and including a first radially elongated dependent arm pivotally connected adjacent its lower end to said connecting means and a second radially elongated arm provided adjacent its outer end with work piece receiving jaws and rotatable out of and back to an at rest position alongside said flat reciprocating portion, and control means including operating means sequentially effective to initiate operation of said first actuating means in one direction, operation of said second actuating means in one direction, operation of said first actuating means in the opposite direction, and operation of said second actuating means in the opposite direction, whereby a series of work pieces are advanced along said conveyor mechanism assembly from each work piece supporting means to the next work piece supporting means.

References Cited in the file of this patent
UNITED STATES PATENTS

| | | |
|---|---|---|
| 2,270,206 | Flygare et al. | Jan. 13, 1942 |
| 2,771,716 | Joyce | Nov. 27, 1956 |
| 2,804,962 | Sherman | Sept. 3, 1957 |
| 2,807,973 | Meyer et al. | Oct. 1, 1957 |
| 2,831,381 | Narel | Nov. 19, 1957 |
| 2,867,058 | Balsiger et al. | June 6, 1959 |
| 2,909,873 | Fisk | Oct. 27, 1959 |